United States Patent
Kashiwazaki et al.

[11] Patent Number: 6,011,098
[45] Date of Patent: *Jan. 4, 2000

[54] WATER-BASED INK

[75] Inventors: Akio Kashiwazaki, Yokohama; Yuko Suga, Tokyo; Aya Takaide, Yokohama, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/227,407

[22] Filed: Apr. 14, 1994

[30] Foreign Application Priority Data

| Apr. 26, 1993 | [JP] | Japan | 5-099527 |
| Apr. 26, 1993 | [JP] | Japan | 5-099528 |
| May 10, 1993 | [JP] | Japan | 5-108233 |
| May 18, 1993 | [JP] | Japan | 5-116077 |

[51] Int. Cl.$^7$ .................................................. C08K 5/06
[52] U.S. Cl. .................. 524/377; 524/376; 524/270; 524/379; 524/389; 524/430; 524/497; 524/556; 524/612
[58] Field of Search ................ 523/160; 524/376, 524/377, 270, 430, 497, 556, 612, 379, 389; 106/20 R, 23 R, 23 C

[56] References Cited

U.S. PATENT DOCUMENTS

| Re. 32,411 | 5/1987 | Hutter | 525/167.5 |
| 3,674,726 | 7/1972 | Kirk | 106/139 X |
| 4,097,440 | 6/1978 | Maximovich et al. | 524/376 |
| 4,097,645 | 6/1978 | Toyoda et al. | 428/306 |
| 4,111,878 | 9/1978 | Ruhf | 525/376 X |
| 4,124,555 | 11/1978 | Gross et al. | 524/376 |
| 4,148,781 | 4/1979 | Narukawa et al. | 106/109 X |
| 4,148,944 | 4/1979 | Ruhf | 524/376 X |
| 4,153,592 | 5/1979 | Burroway | 524/376 X |
| 4,153,593 | 5/1979 | Zabiak et al. | 524/376 X |
| 4,197,135 | 4/1980 | Bailey et al. | 106/23 |
| 4,230,609 | 10/1980 | Burroway et al. | 524/376 X |
| 4,302,560 | 11/1981 | Becher et al. | 525/327 |
| 4,371,582 | 2/1983 | Sugiyama et al. | 428/341 |
| 4,410,657 | 10/1983 | Loch | 524/376 X |
| 4,434,268 | 2/1984 | Doroszkowky et al. | 524/376 X |
| 4,465,800 | 8/1984 | Bhatia | 524/376 X |
| 4,471,079 | 9/1984 | Enami | 523/161 |
| 4,523,922 | 6/1985 | Ong et al. | 524/376 X |
| 4,526,910 | 7/1985 | Das et al. | 524/376 X |
| 4,597,794 | 7/1986 | Ohta et al. | 106/20 |
| 4,645,611 | 2/1987 | Campbell et al. | 252/62.51 |
| 4,680,332 | 7/1987 | Hair et al. | 524/377 |
| 4,705,567 | 11/1987 | Hair et al. | 106/20 |
| 4,789,400 | 12/1988 | Solodar et al. | 524/612 |
| 4,804,411 | 2/1989 | Eida et al. | 106/22 |
| 4,830,911 | 5/1989 | Kojima et al. | 428/342 |
| 4,847,316 | 7/1989 | Schick et al. | 524/376 X |
| 4,855,348 | 8/1989 | Strader | 524/376 X |
| 4,857,568 | 8/1989 | Butters et al. | 523/456 |
| 4,864,324 | 9/1989 | Shirota et al. | 346/1.1 |
| 4,895,785 | 1/1990 | Torimoto et al. | 430/137 |
| 4,912,157 | 3/1990 | Clark et al. | 524/376 X |
| 4,914,141 | 4/1990 | Matsuo et al. | 523/122 |
| 4,954,395 | 9/1990 | Hasegawa et al. | 428/318.4 |
| 4,988,572 | 1/1991 | Butters et al. | 428/413 |
| 5,017,644 | 5/1991 | Fuller et al. | 524/612 |
| 5,085,698 | 2/1992 | Ma et al. | 106/20 |
| 5,120,361 | 6/1992 | Winnik et al. | 106/22 |
| 5,129,948 | 7/1992 | Breton et al. | 106/22 |
| 5,130,290 | 7/1992 | Tanimoto | 503/201 |
| 5,139,574 | 8/1992 | Winnik et al. | 106/22 |
| 5,140,339 | 8/1992 | Higuma et al. | 346/1.1 |
| 5,151,128 | 9/1992 | Fukushima et al. | 106/20 |
| 5,157,067 | 10/1992 | Burditt et al. | 524/270 |
| 5,160,370 | 11/1992 | Suga et al. | 106/20 |
| 5,172,133 | 12/1992 | Suga et al. | 346/1.1 |
| 5,184,148 | 2/1993 | Suga et al. | 346/1.1 |
| 5,229,786 | 7/1993 | Suga et al. | 346/1.1 |
| 5,275,647 | 1/1994 | Winnik | 106/22 E |
| 5,288,790 | 2/1994 | Nakahara et al. | 524/495 |
| 5,364,462 | 11/1994 | Crystal et al. | 106/22 R |
| 5,374,495 | 12/1994 | Ata et al. | 430/110 |
| 5,380,769 | 1/1995 | Titterington et al. | 523/161 |

FOREIGN PATENT DOCUMENTS

| 0068903 | 1/1983 | European Pat. Off. . |
| 0514159 | 11/1992 | European Pat. Off. . |
| 0581135 | 2/1994 | European Pat. Off. . |
| 56-147859 | 11/1981 | Japan . |
| 56-147860 | 11/1981 | Japan . |
| 56-147863 | 11/1981 | Japan . |
| 56-147868 | 11/1981 | Japan . |
| 56-157470 | 12/1981 | Japan . |
| 139150 | 8/1982 | Japan | 524/379 |

(List continued on next page.)

OTHER PUBLICATIONS

Xerox Disclosure Journal, vol. 12, No. 4, Jul./Aug. 1987, Rochester, N.Y. p. 169, Kang 'Ink Jet Printing Method for High Waterfastness and Lightfastness on Printed Images'.

*Primary Examiner*—Judy M. Reddick
*Attorney, Agent, or Firm*—Fitzpatrick, Cella, Harper & Scinto

[57] ABSTRACT

A water-based ink containing a pigment, a dispersant for dispersing the pigment, a water-soluble organic solvent, and water. The dispersant used is at least one compound selected from (a) a copolymer having a hydrophilic part and a hydrophobic part, the hydrophilic part having at least one monomer containing a long-chain nonionic group selected from the following formulae (I) to (III), and α, β-ethylenic unsaturated carboxylic acid, $$CH_2=C(R)-COO-(CH_2CH_2O)_mH \quad (I)$$

$$CH_2=C(R)-COO-(CH_2CH_2O)_n-(CH_2)_lH \quad (II)$$

$$CH_2=C(R)-COO-(CH_2CH_2O)_p\text{-phenyl-}(CH_2)_qH \quad (III)$$

where R is H or $CH_3$, m and n are each a numeral from 2 to 24, l is a numeral from 1 to 12, p is a numeral from 1 to 12, and q is a numeral from 1 to 16; and (b) polyethyleneimine. The ink may be used in an apparatus and according to the present ink jet recording method.

19 Claims, 4 Drawing Sheets

FOREIGN PATENT DOCUMENTS

| | | |
|---|---|---|
| 58-80368 | 5/1983 | Japan . |
| 61-247774 | 11/1986 | Japan . |
| 61-272228 | 12/1986 | Japan . |
| 62-568 | 1/1987 | Japan . |
| 62-101671 | 5/1987 | Japan . |
| 62-101672 | 5/1987 | Japan . |
| 1-249869 | 10/1989 | Japan . |
| 1-301760 | 12/1989 | Japan . |
| 4-57859 | 2/1992 | Japan . |
| 4-57860 | 2/1992 | Japan . |

WATER-BASED INK

BACKGROUND OF THE INVENTION

1. Field of the Invention

The present invention relates to a water-based ink with which recording can be made on not only coated paper, but also on non-coated paper generally used in offices and homes, i.e., so-called plain paper, at high printing density and quality. This invention further relates to an ink jet recording method using the ink, as well as equipment using the ink.

2. Description of the Related Art

An ink jet recording technique is advantageous in that less noise is generated during recording, and recording images of high resolution are obtained at a high speed by using heads with a high degree of integration. Such an ink jet recording technique employs, as a recording liquid, ink that is prepared by dissolving various water-soluble dyes in water or a mixture of water and an organic solvent. However, the use of water-soluble dyes often causes a problem in light resistance of recorded images because the water-soluble dyes are inherently poor in light resistance.

Owing to the fact that ink is water-soluble, there also occurs a problem in water resistance of recorded images. In other words, if recorded images are moistened with rain, sweat or drinking water, they are likely to blur or disappear.

Meanwhile, because of similar problems with respect to stationery usages involving such needs as ball pens employing dyes, various types of water pigment inks for stationery have been proposed with a view to solving the problems of resistance against light and water. From the standpoint of using water pigment inks, proposals for achieving dispersion stability, preventing ink from solidifying at ball points, and preventing abrasion of balls used in ball pens are discussed in, e.g., Japanese Patent Laid-Open No. 58-80368, No. 61-247774, No. 61-272278, No. 62-568, No. 62-101671, No. 62-101672, No. 1-249869, and No. 1-301760. Recently, ball pens, markers and the like using water-based pigment inks have been sold on the market. As ink jet recording ink using water pigment ink, Japanese Patent Laid-Open No. 56-147859, No. 56-147860, etc. propose ink using a particular water-soluble solvent and a high-molecular dispersant. Further, ink using both a pigment and a dye is proposed in Japanese Patent Laid-Open No. 4-57859, No. 4-57860, etc.

However, conventional water-based pigment ink has a disadvantage in that printing quality and density are remarkably deteriorated depending on the types of paper used, especially when recording is made on plain paper (such as copying paper and bond paper widely used in offices). In general, since the surface condition of plain paper is not uniform, unlike specific paper for ink jet recording, the quality of prints on plain paper varies depending on differences in absorption, spread and other properties of the ink. From the viewpoint particularly of printing density, which affects the quality of prints to a large extent, printing quality is less affected by ink using water-soluble dyes depending on the surface condition of paper as dyes are fixed to paper fibers and tend to easily stay on the paper surface. On the other hand, because water-based pigment ink establishes printing density by leaving pigments on the paper surface, the paper surface condition largely affects the printing density. More specifically, water-based pigment ink employs alkali-soluble resins as a dispersant in most cases so that printing density is increased by agglomeration of the resins on the paper surface. Although printing quality and density are remarkably deteriorated with some types of paper, it is thought that the use of alkali-soluble resins, especially (meth-) acrylic acid copolymers, is effective in not only satisfying printing quality and density, but also providing satisfactory dispersion of pigments and other properties. On the other hand, if those resins are used with ink for ink jet recording, many problems concerning reliability such as discharge stability, dispersion stability for a long term, and solidification of ink left at the fine nozzle end for a long time would be remained unsolved. This means that the use of those resins makes it difficult to achieve the desired printing density and quality and the desired reliability at the same time.

As means for improving printing density and quality, ink using alkali-soluble resins as a dispersant is disclosed in, e.g., Japanese Patent Laid-Open No. 56-147863, No. 56-147868, No. 56-157470, No. 60-223074 and No. 60-223075. However, the disclosed types of ink cannot provide satisfactory printing density and quality when used for ink jet recording.

Accordingly, there has been demand for an ink which can improve printing density and quality while meeting the reliability, required when used for ink jet recording, and particularly, stability in dispersion and discharge.

SUMMARY OF THE INVENTION

In view of the above-discussed problems in the prior art, an object of the present invention is to provide a water-based pigment ink with which recording can be made on various kinds of plain paper at a high printing density and quality while ensuring satisfactory reliability. Providing an ink jet recording method using the ink, as well as equipment using the ink, is also an objective.

Another object of the present invention is to provide a water-based pigment ink which has satisfactory reliability in prevention of ink from solidifying at the fine nozzle end (orifice), stability during storage for a long term, etc., and an ink jet recording method using the ink.

The above objects are achieved by the present invention as follows.

The water-based ink according to the invention that comprises a pigment, a dispersant for dispersing the pigment, a water-soluble organic solvent, and water, wherein the dispersant is at least one compound selected from the group consisting of (a) to (c):

(a) a polymer having a hydrophilic part and a hydrophobic part, the polymer containing, as a monomer making up the hydrophilic part, 3 to 25 mol % of at least one monomer containing a long-chain nonionic group, which is selected from the following formulae (I) to (III), and 5 to 60 mol % of α, β-ethylenic unsaturated carboxylic acid,

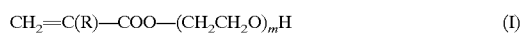

$$CH_2=C(R)-COO-(CH_2CH_2O)_mH \quad (I)$$

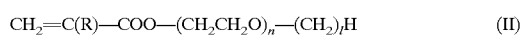

$$CH_2=C(R)-COO-(CH_2CH_2O)_n-(CH_2)_lH \quad (II)$$

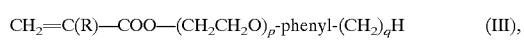

$$CH_2=C(R)-COO-(CH_2CH_2O)_p\text{-phenyl-}(CH_2)_qH \quad (III),$$

where R is H or $CH_3$, m and n are each a numeral from 2 to 24, l is a numeral from 1 to 12, p is a numeral from 1 to 12, and q is a numeral from 1 to 16;

(b) a polymer having a hydrophilic part and a hydrophobic part, the polymer containing, as a monomer making up the hydrophobic part, 5 to 70 mol % of at least one monomer selected from the following formulae (IV) and (V),

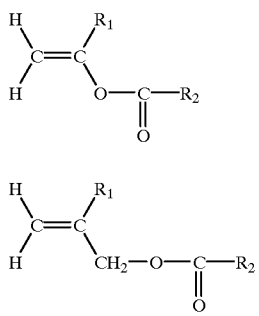

where $R_1$ is H or $CH_3$ and $R_2$ is an alkyl group with 1 to 5 carbons; and (c) polyethyleneimine.

Also, the water-based ink according to the invention contains a pigment, a dispersant, a water-soluble organic solvent, and water, wherein the ink contains at least one water-soluble organic solvent selected from the group consisting of monoalkyl ether of diol, monoalkyl ether of triol and dialkyl ether of triol, and white inorganic fine particles.

Further, the water-based ink according to the invention contains a pigment, a dispersant, a water-soluble organic solvent, and water, wherein the ink contains, as the water-soluble organic solvent, at least one selected from the group consisting of monoalkyl ether of diol, monoalkyl ether of triol and dialkyl ether of triol, and as the dispersant, rosin-denaturated maleic acid.

The ink jet recording method according to the invention resides in that droplets of ink containing a recording agent and a liquid medium is discharged through orifices of a recording head in accordance with a recording signal to thereby make recording on a recording material, wherein the ink is any one of the above types of aqueous ink.

The recording unit according to the invention comprises an ink receptacle containing ink and a head portion for discharging the ink in the form of ink droplets, wherein the ink is any one of the above types of aqueous ink.

The ink cartridge according to the invention comprises an ink receptacle containing ink, wherein the ink is any one of the above types of aqueous ink.

The ink jet recording apparatus according to the invention includes a recording unit comprising an ink receptacle containing ink and a head portion for discharging the ink in the form of ink droplets, wherein the ink is any one of the above types of aqueous ink.

The ink jet recording apparatus according to the invention comprises a recording head for discharging ink droplets, an ink cartridge having an ink receptacle containing ink, and an ink supply portion for supplying the ink from the ink cartridge to the recording head, wherein the ink is any one of the above types of aqueous ink.

DETAILED DESCRIPTION OF THE PREFERRED EMBODIMENTS

Figure 1:
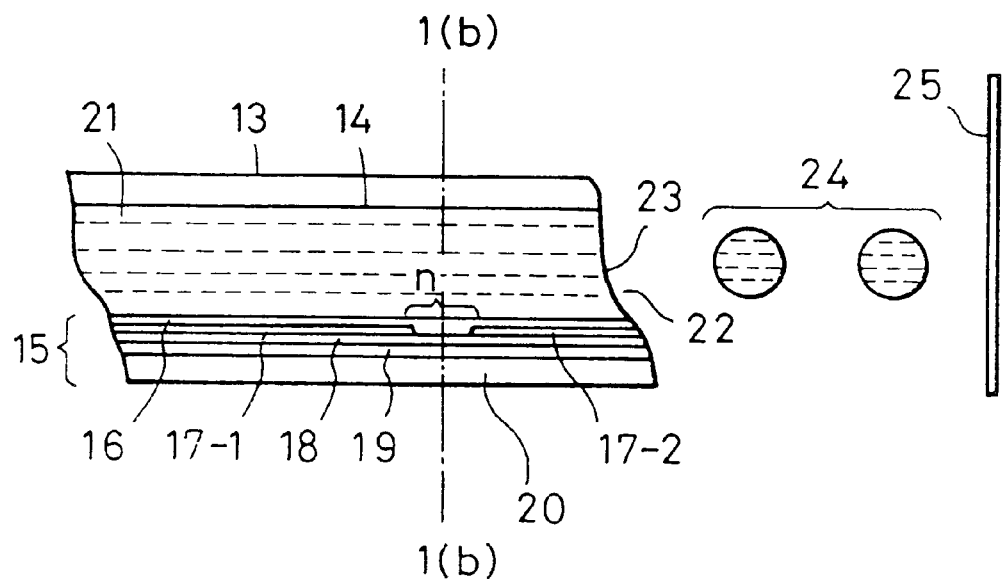
FIG. 1(a) is a sectional view of one example of the structure of a head according to the present invention.
FIG. 1(b) is a sectional view of a cross-section taken along line 1(b)–1(b) in FIG. 1(a).
Figure 1:
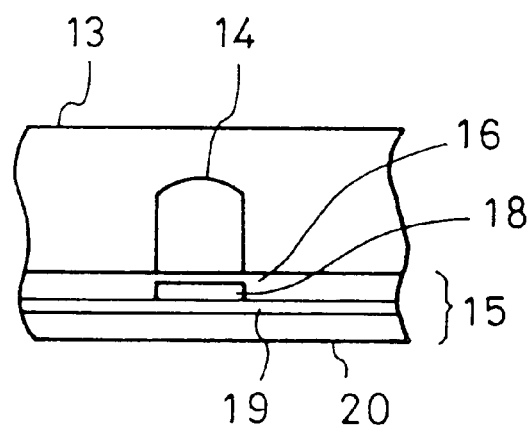

As a result of intensively studying the causes of deteriorating printing quality and density depending on the types of paper used when ink jet recording is performed on plain paper with ink using water-based pigments, the inventors have discovered that the surface condition of paper largely affects printing quality, especially printing density. In other words, water-based pigment ink establishes printing density owing to the fact that discharged ink starts agglomerating immediately after reaching the paper surface and then remains there. If the paper has such a surface condition as to cause the ink to lose stability, good printing density is obtained, but if the ink starts to penetrate before agglomerating, the desired printing density cannot be obtained. While plain paper is mainly classified into acid paper and neutralized paper, any kind of paper can be subjected to various treatments depending on applications, and hence has different surface conditions. This results in difficulties in designing an ink so that the ink begins to instantaneously agglomerate on the paper surfaces under every condition. Further, designing an ink so that it is unstable in a dispersion state, providing desired printing density, as described above, is contradictory to the reliability required for ink jet recording ink, i.e., discharge stability, stability during storage for a long term, and prevention of solidification of ink left for a long time at the fine nozzle end (orifice).

With attention focused on a dispersant for use with water-based pigment inks, the inventors have found that, by using at least one polymer selected from the above groups (a) to (c) as a dispersant, desired printing density and quality can be obtained simultaneously with achievement of satisfactory reliability required for ink jet recording ink, i.e., discharge stability, stability during storage for a long term, and prevention of ink left for a long time from solidifying at the fine nozzle end of an ink jet recording apparatus.

The inventors have also found that printing density and discharge characteristics are improved by using a combination of pigments and white inorganic fine particles, and a specific solvent, or by using rosin-denaturated maleic acid, as a dispersant, and a particular solvent in combination.

The present invention will hereinafter be described in detail.

The water-soluble resin selected from the above group (a) and used as a dispersant in the present invention contains 3 to 25 mol % of at least one monomer containing a long-chain nonionic group, which is selected from the above three types of compounds having the general structures represented by the formulae (I) to (III). Examples of such a monomer include:

as for the formula (I), $CH_2=C(R)-COO-(CH_2CH_2O)_m$ H (m=2 to 24);

$CH_2=C(CH_3)-COO-(CH_2CH_2O)_m$H: Blenmer-PE-90 (m=1.9, Nippon Oil & Fats, Co.,), $CH_2=C(CH_3)-COO-(CH_2CH_2O)_m$H: Blenmer-PE-200 (m=4.4, Nippon Oil & Fats, Co.,), $CH_2=C(CH_3)-COO-(CH_2CH_2O)_m$H: Blenmer-PE-350 (m=7.7, Nippon Oil & Fats, Co.,), and $CH_2=CH-COO-(CH_2CH_2O)_mH$ (m=24): on experimental basis;

as for the formula (II), $CH_2=C(R)-COO-(CH_2CH_2O)_n-(CH_2)_lH$ (n=2 to 24, l=1 to 12);

methoxytriethylene glycol acrylate (R=H, n=3, l=1): NK ester AM-30G, methoxypolyethylene glycol #400 acrylate (R=H, n=approximately 10, l=1): NK ester AM-90G, methoxydiethylene glycol methacrylate (R=$CH_3$, n=2, l=1): NK ester M-20G, methoxytetraethylene glycol methacrylate (R=$CH_3$, n=4, l=1): NK ester M-40G, methoxypolyethylene glycol #400 methacrylate (R=$CH_3$, n=approximately 10, l=1): NK ester M-90G, methoxypolyethylene glycol #1000 methacrylate (R=H, n=3, l=1): NK ester AM-230G, and buthoxydiethylene glycol acrylate (R=H, n=2, l=4): NK ester AB-20G (all these products being manufactured by Shin Nakamura Chemical Industry Co., Ltd.); and as for the formula (III), $CH_2=C(R)-COO-(CH_2CH_2O)_p$-phenyl-$(CH_2)_qH$ (p=1 to 12, q=0 to 16);

phenoxydiethylene glycol acrylate (R=H, p=2, q=0): NK ester AMP-20G, phenoxypolyethylene glycol acrylate (R=H, p=approximately 5, q=0): NK ester AMP-60G, nonylphenoxyethyl acrylate (R=H, p=1, q=8): NK ester NPA-10G (all these products being manufactured by Shin Nakamura Chemical Industry Co., Ltd.), and $CH_2=CH-COO-(CH_2CH_2O)_{10}$-phenyl-$(CH_2)_{16}H$: on experimental basis.

Further, it is essential for the present ink to contain, as a hydrophilic monomer, 5 to 60 mol % of α, β-ethylenic unsaturated carboxylic acid. Examples of such a monomer include acrylic acid, methacrylic acid, maleic acid, itaconic acid, fumaric acid, etc. Derivatives of these acids may also be used.

Examples of a hydrophobic monomer for use in copolymerization of the dispersant in the present invention include styrenes such as styrene, α-methylstyrene and vinyltoluene, and (meth-)acryl acid alkyl esters. The (meth-)acryl acid alkyl esters includes methyl (meth-)acrylate, ethyl (meth-)acrylate, propyl (meth-)acrylate, isopropyl (meth-)acrylate, n-butyl (meth-)acrylate, sec-butyl (meth-)acrylate, tert-butyl (meth-)acrylate, 2-methylbutyl (meth-)acrylate, 2-ethylbutyl (meth-)acrylate, 3-methylbutyl (meth-)acrylate, 1,3-dimethylbutyl (meth-)acrylate, pentyl (meth-)acrylate, 3-pentyl (meth-)acrylate, hexyl (meth-)acrylate, 2-ethylhexyl (meth-)acrylate, heptyl (meth-)acrylate, octyl (meth-)acrylate, nonyl (meth-)acrylate, 2-ethoxyethyl acrylate, 3-ethoxylpropyl acrylate, 2-ethoxybutyl acrylate, 3-ethoxybutyl acrylate, and dimethylaminoethyl acrylate. An alcohol ingredient for use in half-esterification includes methanol, ethanol, and propanol.

Polymerization of the dispersant in the present invention using such monomers can readily be performed by radical copolymerization.

The weight-average molecular weight of the polymer is preferably in the range of 500 to 30000, more preferably 1000 to 15000.

Further, the content of the polymer is preferably in the range of 0.1 to 5 wt % with respect to the total ink weight.

It has been confirmed that the use of the polymer described above is highly effective in not only improving printing density and quality due to an agglomerating effect provided by the α, β-ethylenic unsaturated carboxylic acid, but also in ensuring discharge stability, stability during storage for a long term, and prevention of ink left for a long time from solidifying at the fine nozzle end which are required for ink jet recording ink, due to an effect of the long-chain nonionic group containing monomer, i.e., an improvement in solubility and pH-stability. Additionally, it has also been confirmed that mixing the long-chain nonionic group containing monomer in the dispersant is also effective in improving printing density and quality.

The water-soluble resin selected from the above group (b) and used as a dispersant in the present invention contains in a copolymer, a monomer having a hydrophobic part, 5 to 70 mol % of at least one monomer having the general structure represented by the formula (IV) or (V). Practically, examples of such a monomer include vinyl acetate, isopropenyl acetate, allyl acetate, allyl propionate, vinyl butyrate, allyl butyrate, etc.

Other hydrophobic monomers for use in copolymerization include styrene, styrene derivatives, vinylnaphthalene, vinylnaphthalene derivatives, etc.

Examples of a hydrophilic monomer for use in copolymerization include acrylic acid, acrylic acid derivatives, maleic acid, maleic acid derivatives, itaconic acid, itaconic acid derivatives, fumaric acid, fumaric acid derivatives, etc.

Polymerization of the dispersant in the present invention using such monomers can readily be performed by radical copolymerization.

The weight-average molecular weight of the polymer is preferably in the range of 500 to 30000, more preferably 1000 to 15000.

Further, the content of the copolymer is preferably in the range of 0.1 to 5 wt % with respect to the total ink weight.

The water-soluble resin given by the above group (c) and used as a dispersant in the ink of the present invention is polyethyleneimine. This polymer is not a completely linear high molecular weight molecule, but has branched parts to some extent and includes primary, secondary and tertiary amino nitrogen. Properly anion- or cation-denaturated polyethyleneimine can also satisfactorily be used. Practical examples include Epomin series manufactured by Nippon Shokubai Co., Ltd. The weight-average molecular weight of the polymer is preferably in the range of 1000 to 40000. Further, the content of the polymer is preferably in the range of 0.1 to 10 wt % with respect to the total ink weight.

Since polyethyleneimine itself has higher pH-stability and resolubility than alkali-soluble resins conventionally used as a dispersant, its use is thought to be very effective in ensuring discharge stability, stability during storage for a long term, and prevention of ink left for a long time from solidifying at the fine nozzle end, which are required for ink jet recording ink. Conversely, it is generally inferred that the use of polyethyleneimine having such properties deteriorates printing density and quality, as described above. The satisfactory printing density and quality resulted herein are presumably based on the fact that polyethyleneimine itself has high affinity with the paper component, but the genuine reason is not yet clear.

Further, the inventors have found that wiping resistance of prints is improved in the case of using polyethyleneimine.

The content of pigment in the ink of the present invention, which contains at least one polymer selected from the above groups (a) to (c), is preferably in the range of 1 to 20 wt %, more preferably 2 to 12 wt %., for the total ink weight. So long as the above condition is satisfied, any desired pigment can be used in the present invention. As carbon black for use in black ink, there can be used one which is manufactured by the furnace method or the channel method, and has the primary particle size of 15 to 40 nm, a specific surface area of 50 to 300 m$^2$/g according to the BET method, a DBP oil absorption amount of 40 to 150 ml/100 g, a volatile ingredient of 0.5 to 10%, and a pH value of 2 to 9, e.g., such as, for example, commercially available carbon black NO. 2300, NO. 900, MCF88, NO. 33, NO. 40, NO. 45, NO. 52, MA7, MA8 and NO. 2200B (by Mitsubishi Chemical Industries Co., Ltd.), RAVEN 1255 (by Columbia Co.), MOGUL L (by Cabot Co.), and Color Black FW1, Color Black FW18, Color Black S170, Color Black S150 and Printex U (by Degussa, AG). Other carbon black newly manufactured for the present invention can also be used. Examples of a pigment for use in yellow ink include C.I. Pigment Yellow 1, C.I. Pigment Yellow 2, C.I. Pigment Yellow 3, C.I. Pigment Yellow 13, C.I. Pigment Yellow 16, and C.I. Pigment Yellow 83. Examples of a pigment for use in magenta ink include C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 112, and C.I. Pigment Red 122. Examples of a pigment for use in cyan ink include C.I. Pigment Blue 1, C.I. Pigment Blue 2, C.I. Pigment Blue 3, C.I. Pigment Blue 15:3, C.I. Pigment Blue 16, C.I. Pigment Blue 22, C.I. Vat Blue 4, and C.I. Vat Blue 6. In addition, other pigments newly manufactured for the present invention can also be used.

Moreover, the ink of the present invention is preferably prepared to be neutral or alkaline as a whole for the purpose of improving solubility of the above-described water-soluble resin and ensuring higher stability during storage for a long term. In this connection, however, since various members used in the ink jet recording apparatus may be apt to corrode, the pH range is preferably held in the range of 7 to 10.

Examples of a pH adjuster include various organic amines such as diethanolamine and triethanolamine, inorganic alkaline agents such as hydroxides of alkaline metals including sodium hydroxide, lithium hydroxide, potassium hydroxide, etc., organic acids, and mineral acids.

The above-described pigment and water-soluble resin are dispersed or dissolved in a water-based medium.

A water-based medium suitable for the ink of the present invention is a mixture of water and a water-soluble solvent. Preferably used as the water is not usual water containing various ions, but ion-exchanged water (deionized water).

As other optional solvent ingredient which can be used in combination with the above-described ingredients, a water-soluble organic solvent to be mixed to water includes, for example, alkyl alcohols with 1 to 4 carbons such as methyl alcohol, ethyl alcohol, n-propyl alcohol, isopropyl alcohol, n-butyl alcohol, sec-butyl alcohol, and tert-butyl alcohol; amides such as dimethyl formamide and dimethyl acetoamide; ketones or ketone alcohols such as acetone and diacetone alcohol; ethers such as tetrahydrofuran and dioxane; polyalkylene glycols such as polyethylene glycol and polypropylene glycol; alkylene glycols with alkylene groups each containing 2 to 6 carbons, such as ethylene glycol, propylene glycol, butylene glycol, triethylene glycol, 1, 2, 6-hexanetriol, thiodiglycol, hexylene glycol, and diethylene glycol; glycerin; lower alkyl ethers of polyhydric alcohols, such as monomethyl(or ethyl) ether of ethylene glycol, methyl(or ethyl) ether of diethylene glycol, and monomethyl (or ethyl) ether of triethylene glycol ; N-methyl-2-pyrrolidone, 2-pyrrolidone, and 1,3-dimethyl-2-imidazolidinone. Of these many water-soluble organic solvents, polyhydric alcohols such as diethylene glycol and lower alkyl ethers of polyhydric alcohols, such as monomethyl(or ethyl) ether of triethylene glycol, are preferable.

To provide discharge stability, it is effective to add ethanol, isopropyl alcohol, or lower alkyl ethers of polyhydric alcohols. It is believed that air bubbles can more steadily be generated in the ink over a thin-film resistor by addition of such a solvent.

A water-soluble solvent especially preferably combined with the dispersant (a) includes monoalkyl ether of diol and/or monoalkyl ether of triol and/or dialkyl ether of triol (with an alkyl group having 4 or more carbons). Among them, monobutyl ether of diethylene glycol, monobutyl ether of ethylene glycol, monobutyl ether of triethylene glycol, monopentyl ether of glycerin, dihexyl ether of 1,2, 6-hexanetriol, diethyl ether of 1,2,4-butanetriol, etc. The content of monoalkyl ether of diol and/or monoalkyl ether of triol and/or dialkyl ether of triol (with an alkyl group having 4 or more carbons) is preferably in the range of 0.01 to 5 wt % for the total ink weight from the standpoint of improving printing density, printing quality and deposit of the ink.

The content of the water-soluble organic solvent in the ink of the present invention is usually in the range of 3 to 50 wt %, preferably 3 to 40 wt %, for the total ink weight. The content of the water used is in the range of 10 to 90 wt %, preferably 30 to 80 wt %, for the total ink weight.

In order for the ink to have further desired physical properties, a surfactant, a bubble retarder, an antiseptic, etc. can be added to the ink of the present invention, if necessary, in addition to the above-described ingredients. Commercially available water-soluble dyes can also be added.

So long as stability during storage and other required properties of the ink will not adversely be affected, no limitations exist on the kind of surfactant used. There are, e.g., anionic surfactants such as fatty acid salts, ester sulfates of higher alcohols, ester sulfates of liquid fatty oil, and alkylallyl sulfonates; and nonionic surfactants such as polyoxyethylene alkyl ethers, polyoxyethylene alkyl esters, polyoxyethylenesorbitane alkyl esters, acetylene alcohol, and acetylene glycol. One or two surfactants properly selected from the above examples can be used. Depending on the kind of dispersant, the amount of surfactant(s) used is preferably in the range of 0.01 to 5 wt % for the total ink weight. In this connection, the surfactant content is preferably selected so that the ink has a surface tension not less than 30 dyne/cm. The reason is that if the surface tension of the ink is less than the above value, problems trouble such as printing deviation (i.e., shift in arrival point of the ink droplet) would be caused due to wetting at the nozzle end in the ink jet recording intended by the present invention.

A second aspect of the present invention resides in water-based ink containing a pigment, a dispersant, a water-soluble organic solvent, and water, wherein the ink contains at least one water-soluble organic solvent selected from the group consisting of monoalkyl ether of diol, monoalkyl ether of triol and dialkyl ether of triol, and white inorganic fine particles.

The white inorganic particles for use with the second aspect of the present invention are preferably titanium dioxide fine particles or alumina fine particles, but are not limited thereto. Any other fine particles may also be used so long as they can stably disperse together with the pigment used as a color material in the ink jet recording ink. While no special limitations exist on the particle shape, spherical particles are preferably used. Further, these particles may be surface-treated to become hydrophilic or hydrophobic. Among them, titanium dioxide particles whose surfaces are treated to be hydrophilic are especially preferable. These types of particles are on the market as, for example, the Titania series from Idemitsu Kosan Co., Ltd. Other types of titanium dioxide fine particles or alumina fine particles are on the market as, e.g., Titanium Dioxide P25 and Aluminum Oxide C from Nippon Aerosil Co., Ltd.

The ratio of primary particle size of the white inorganic fine particles contained in the ink to primary particle size of the pigment contained together as a color material is preferably in the range of 1/10 to 5/1. If the ratio is out of that range, it would be hard to achieve the optimum effect of the present invention, particularly with respect to a satisfactory result in printing quality and density. Considering the particle size of the pigment for use in the ink jet recording ink, the primary particle size of the white inorganic fine particles is in the range of 5 to 200 nm, but the range of 5 to 100 nm is preferable for sufficiently fulfilling the objects of the present invention. The content ratio in weight of the white inorganic fine particles to the pigment used together as a color material is preferably in the range of 1/20 to 1/1. If the content ratio in weight is less than 1/20, it would be hard to achieve the optimum good result in printing quality and density. If the content ratio in weight is larger than 1/1, it would be hard to achieve the optimum good result in reliability such as discharge stability and stability during storage. The range of 1/10 to 1/2 is more preferable for optimally fulfilling the objects of the present invention.

While any type of water-soluble resin can be used as a dispersant for the pigment, as a color material, and white inorganic fine particles for use with the second aspect of the present invention, its weight-average molecular weight is preferably in the range of 500 to 30000, more preferably 1000 to 15000. Practical examples of the water-soluble resin include block copolymers or random copolymers, or salts thereof, these copolymers each consisting of two or more monomers selected from styrene, styrene derivatives, vinylnaphthalene, vinylnaphthalene derivatives, aliphatic alcohol esters of α, β-ethylenic unsaturated carboxylic acid, acrylic acid, acrylic acid derivatives, maleic acid, maleic acid derivatives, itaconic acid, itaconic acid derivatives, fumaric acid, fumaric acid derivatives, etc. These resins are particularly preferably used in ink jet recording ink, because they are alkali-soluble resins which are soluble in an aqueous solution containing a base dissolved therein and hence have advantages of enabling lower viscosity of the disperse solution and easier dispersion. Alternatively, a homopolymer of a hydrophilic monomer or salt thereof may be used. Other water-soluble resins such as polyvinyl pyrrolidone, polyvinyl alcohol, carboxymethyl cellulose, and a condensation product of naphthalene sulfonate-formaldehyde, and natural resins such as rosin and shellac can also be used. In addition, various surfactants such as polyoxyethylene alkyl ethers and polyoxyethylene alkyl esters may be used. The content of the water-soluble resin and the surfactant is preferably in the range of 0.1 to 5 wt % for the total ink weight. The above-described pigment, white inorganic fine particles and water-soluble resin are dispersed or dissolved in the water-based medium.

A third aspect of the present invention resides in a water-based ink containing a pigment, a dispersant, a water-soluble organic solvent, and water, wherein the ink contains, as the water-soluble organic solvent, at least one selected from the group consisting of monoalkyl ether of diol, monoalkyl ether of triol and dialkyl ether of triol, and as the dispersant, rosin-denaturated maleic acid.

The rosin-denaturated maleic acid for use with the third aspect of the present invention has no limitations on the kind thereof, and its commercially available products include Malkyd No. 31 and Malkyd No. 32 (by Arakawa Chemicals Co., Ltd.), Hiparac C and Hiparac PR (by Nippon Shellac Co., Ltd.), Harimac 145P and Harimac R-120AH (by Harima Chemical Industry Co., Ltd.), etc. While any type water-soluble resin can be used as a dispersant in combination with the above ingredients in the present invention, its weight-average molecular weight is preferably in the range of 500 to 30000, more preferably 1000 to 15000. Practical examples of the water-soluble resin include block copolymers or random copolymers, or salts thereof, these copolymers each consisting of two or more monomers selected from styrene, styrene derivatives, vinylnaphthalene, vinylnaphthalene derivatives, aliphatic alcohol esters of α, β-ethylenic unsaturated carboxylic acid, acrylic acid, acrylic acid derivatives, maleic acid, maleic acid derivatives, itaconic acid, itaconic acid derivatives, fumaric acid, fumaric acid derivatives, etc. These resins are particularly preferably used in ink jet recording ink, because they are alkali-soluble resins which are soluble in an aqueous solution containing a base dissolved therein and hence have advantages of enabling lower viscosity of the disperse solution and easier dispersion. Alternatively, a homopolymer of a hydrophilic monomer or salt thereof may be used. Other water-soluble resins such as polyvinyl pyrrolidone, polyvinyl alcohol, carboxymethyl cellulose, and a condensation product of naphthalene sulfonate-formaldehyde, and natural resins, e.g., shellac can also be used. In addition, various surfactants such as polyoxyethylene alkyl ethers and polyoxyethylene alkyl esters may be used. The content of the water-soluble resin and the surfactant is preferably in the range of 0.1 to 5 wt % for the total ink weight.

The ink according to any of the aspects of the present invention described above is prepared by adding a pigment to an aqueous solution containing at least a dispersion resin and water, agitating and then dispersing the mixed solution by using dispersion means (described later), and carrying out a process of centrifugal separation, if necessary, thereby obtaining a desired disperse solution. After that, the other ingredients described above are added to the disperse solution and agitated to produce the ink.

Before the solution containing the pigment is subjected to the dispersion process, it is also required to carry out pre-mixing for 30 minutes or more. This pre-mixing operation serves to improve wetting of the pigment surface and to promote adsorption onto the pigment surface.

Bases to be added to the disperse solution in the case of using an alkali-soluble resin are preferably organic amines such as monoethanolamine, diethanolamine, triethanolamine, amine methylpropanol and ammonia, or inorganic bases such as potassium hydroxide and sodium hydroxide.

On the other hand, any types of dispersers which are usually employed can be used in the present invention, and include, e.g., a ball mill, a roll mill and a sand mill.

Among them, a high-speed sand mill is preferable and is commercially available as, e.g., Super Mill, Sand Grinder, Beads Mill, Agitator Mill, Grain Mill, Dyno Mill, Pearl Mill and Cobol Mill (all trade names).

For obtaining a disperse system of the pigment having the desired grain size distribution, the present invention employs a method of reducing the size of pulverizing media in a disperser, increasing the loading rate of the pulverizing media, prolonging the process time, slowing the discharge speed, or sorting the resultant grains through a filter or centrifugal separator after the pulverization. Any combinations of those methods can also be used.

A recording apparatus suitable to make recording with the ink of the present invention is arranged such that the ink in a chamber defined within a recording head is supplied with thermal energy corresponding to a recording signal, and an ink droplet is produced by the supplied energy.

Figure 2:
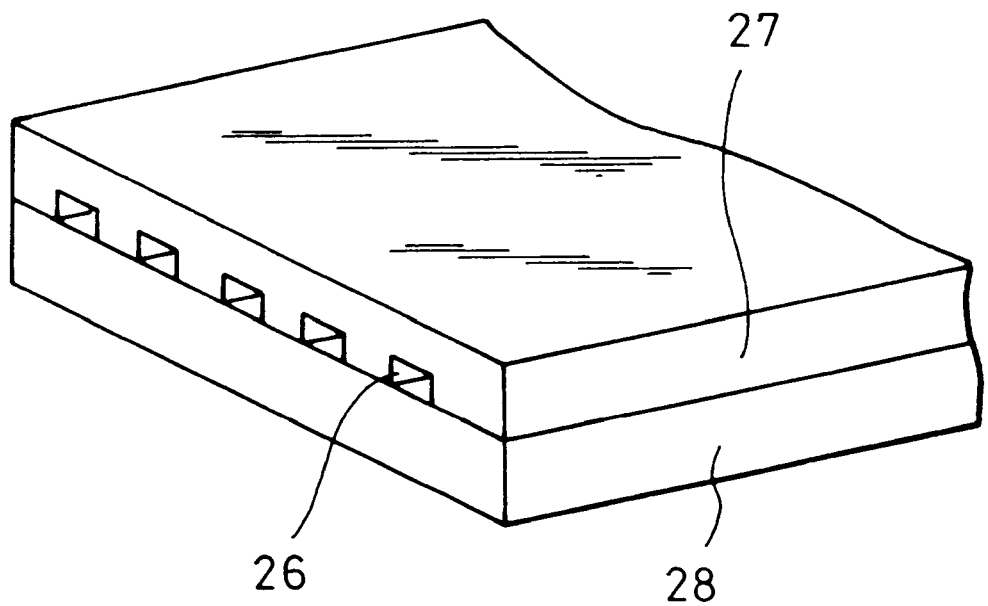
FIG. 2 is a perspective view of a multi-head comprising a number of heads, shown in FIG. 1(a), arranged side by side.

One example of the structure of the head, as a primary part, is shown in FIGS. 1(a), 1(b) and 2. A head 13 is constructed by bonding a glass, ceramic or plastic plate having a channel 14 through which ink is passed, and a heat generating head 15 for use in heat-sensitive recording (the figure showing a thin film head only by way of example) with each other. The heat generating head 15 comprises a protective film 16 formed of, e.g., silicon oxide, aluminum electrodes 17-1, 17-2, a heat-generating resistance material layer 18 formed of, e.g., Nichrome, a heat accumulating layer 19, and a base plate 20 formed of, e.g., alumina and having a high heat radiating ability.

Ink 21 is filled to reach a discharge orifice (fine hole) 22 and forms a meniscus 23 under a pressure P.

When an electric signal is applied to the electrodes 17-1 and 17-2, a region of the heat generating head 15 indicated by n abruptly generates heat so that an air bubble is produced in the ink 21 contacting the region n. The meniscus 23 is projected forwardly with a resultant pressure, causing the ink 21 to discharge and fly in the form of recording droplets 24 from the orifice 22 toward a material 25 on which recording is to be made. FIG. 2 shows an appearance of a multi-head comprising a number of heads, shown in FIG. 1(a), arranged side by side. The multi-head is constructed by bonding a glass plate 27 formed with multiple channels 26 and a heat generating head 28 similar to that described above by referring to FIG. 1(a) with each other.

Incidentally, FIG. 1(a) is a sectional view of the head taken along an ink flow passage, and FIG. 1(b) is a sectional view taken along line 1(b)–1(b) in FIG. 1(a).

Figure 3:
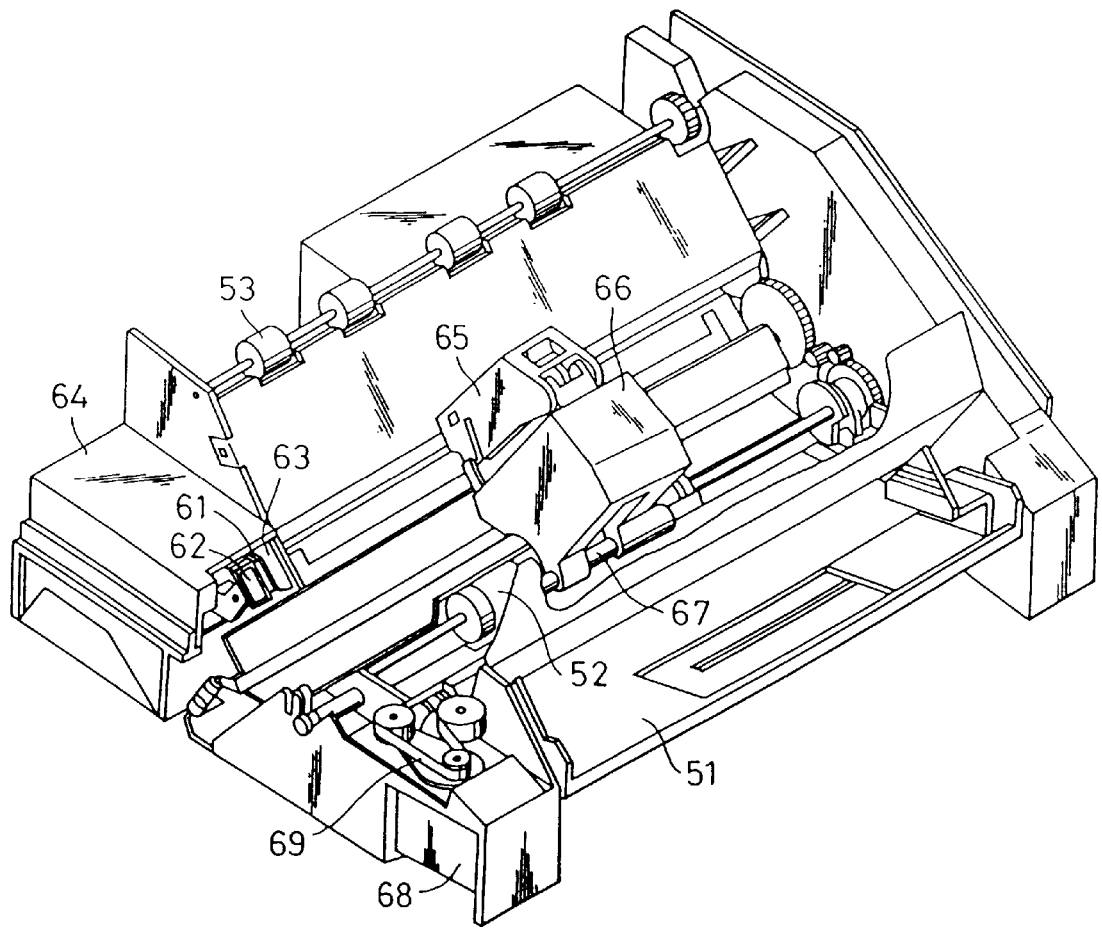
FIG. 3 is a perspective view of an ink jet recording apparatus in which the head of the present invention is incorporated.

FIG. 3 shows one example of an ink jet recording apparatus in which the above-described head is incorporated. In FIG. 3, denoted by 61 is a blade as a wiping member in the form of a cantilever, of which one end is held by a blade holding member to become a fixed end. The blade 61 is disposed at a position adjacent a recording area covered by the recording head and, in the illustrated embodiment, it is held in such a manner as to project into the travel path of the recording head. 62 is a cap which is disposed at its home position adjacent the blade 61 and is movable in a direction perpendicular to the direction of movement of the recording head such that it comes into contact with the ink discharge surface for capping the same. 63 is an ink absorber which is disposed adjacent the blade 61 and is held in such a manner as to project into the travel path of the recording head similarly to the blade 61. The blade 61, the cap 62 and the absorber 63 cooperatively construct a discharge recovery unit 64 in which the blade 61 and the absorber 63 serve to remove moisture, dust, dirt, etc. on the ink discharge surface. 65 is a recording head which includes discharge energy generating means and discharges ink onto a material, on which recording is to be made and which is disposed facing the ink discharge surface including discharge ports arrayed therein, for thereby recording an image. 66 is a carriage on which the recording head 65 is mounted to be reciprocally moved. The carriage 66 is slidably engaged with a guide shaft 67 and is also connected (though not shown) at its part to a belt 69 driven by a motor 68. With such an arrangement, the carriage 66 is movable along the guide shaft 67 so that the recording head 65 can move over the recording area and an area adjacent thereto.

Denoted by 51 is a paper feeding portion through which the recording material is inserted, and 52 is a paper feeding roller driven by a motor (not shown). With such an arrangement, the recording material is fed to a position facing the ink discharge surface of the recording head, and is then guided to a paper discharging portion including paper discharging rolls 53 with the progress of recording.

In the above arrangement, when the recording head 65 is returned to the home position upon the end of recording or other reason, the cap 62 of the head recovery unit 64 is retracted from the travel path of the recording head 65, but the blade 61 is held projected into the travel path. As a result, the ink discharge surface of the recording head 65 is wiped by the recording head 65. When the cap 62 is brought into contact with the ink discharge surface of the recording head 65 for capping the same, it is moved to project into the travel path of the recording head.

When the recording head 65 is moved from the home position to the recording start position, the cap 62 and the blade 61 are in the same positions as those during the above wiping. In that movement, therefore, the ink discharge surface of the recording head 65 is similarly wiped.

The movement of the recording head to the home position adjacent the recording area is performed not only upon the end of recording or the recovery of discharge, but also at predetermined intervals during the time in which the recording head is reciprocally moved over the recording area for recording an image. For each of such movements, the wiping of the ink discharge surface of the recording head is made.

Figure 4:
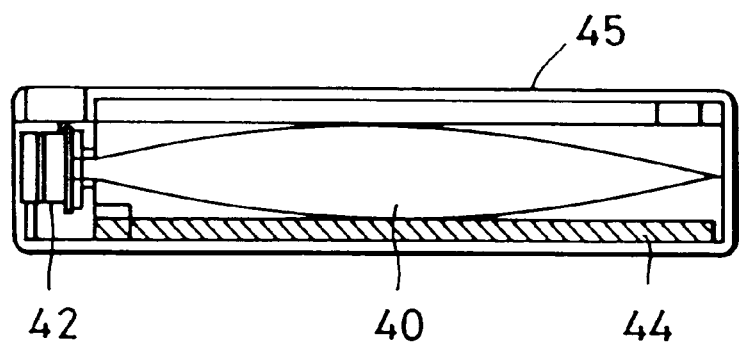
FIG. 4 is a sectional view of one example of an ink cartridge which contains ink supplied to the head through an ink supply tube.

FIG. 4 shows one example of an ink cartridge 45 containing ink supplied to the head through an ink supply tube. In FIG. 4, 40 is an ink bag which contains the ink to be supplied and has a rubber-made plug 42 provided at it distal end. By inserting a needle (not shown) through the plug 42, the ink in the ink bag 40 can be supplied to the head. 44 is an ink absorber for accommodating waste ink.

Figure 5:
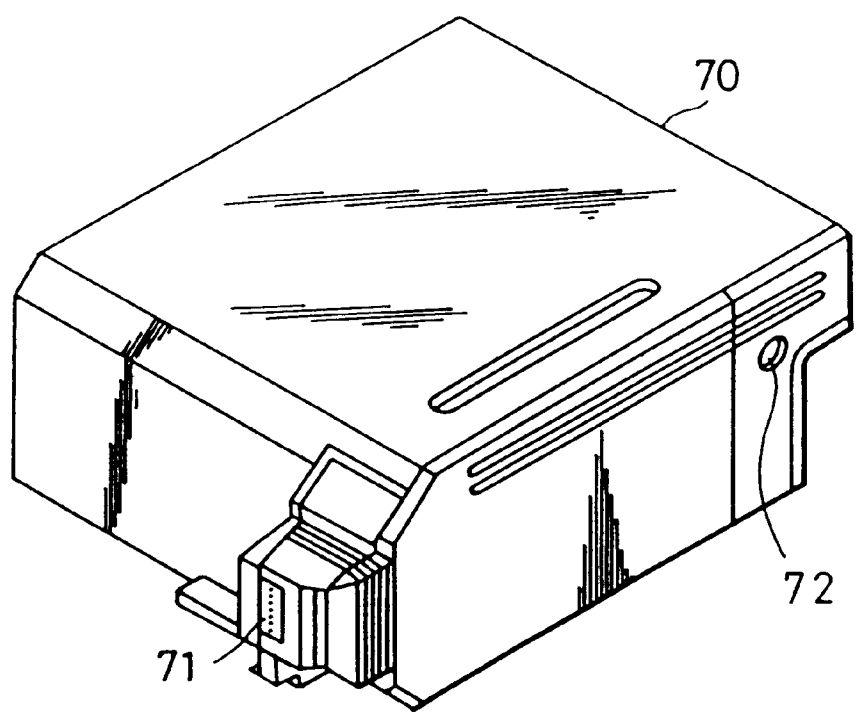
FIG. 5 is a perspective view of one example of an ink jet recording apparatus in which the head and the ink cartridge are integral with each other.

The ink jet recording apparatus for use in the present invention is not limited to the above-described construction in which the head and the ink cartridge are separate from each other, and can also suitably be applied to the construction in which both the members are integral with each other as shown in FIG. 5.

Referring to FIG. 5, 70 is an ink jet cartridge in which an ink absorber impregnated with ink is housed. The ink existing in the ink absorber is discharged in the form of ink droplets through a head portion 71 having a plurality of orifices. 72 is an atmosphere communicating port via which the interior of the cartridge is communicated with the atmosphere.

The ink jet cartridge 70 is used in place of the recording head 65 shown in FIG. 3 and is detachably attached to the carriage 66.

EXAMPLES

Examples Using a Polymer Selected from the Group (a) as Dispersant

Example 1

Polymerization Example 1

50 mol % of styrene, 35 mol % of acrylic acid, and 15 mol % of Blemmer-PE-200 were each put in a mixed solvent of ethylene glycol-monomethyl ether and isopropyl alcohol, and then subjected to solution polymerization in accordance with the ordinary process. Thereby, a polymer 1 for use in the present invention with number-average molecular weight of 9700 and weight-average molecular weight of 13500 was obtained.

| (Preparation of Pigment Dispersed Solution) | |
|---|---|
| polymer 1 polymerized above | 3 parts |
| monoethanolamine | 1 part |
| ion-exchanged water | 75 parts |
| diethylene glycol | 5 parts |

The above ingredients were mixed and heated to 50° C. using a water bath in order to completely dissolve the resin ingredient. Added to this solution were 15 parts of new experimentally manufactured carbon black (MCF 88 by Mitsubishi Chemical Industry Co., Ltd.) and 1 part of isopropyl alcohol, followed by pre-mixing for 30 minutes. After that, the dispersion process was carried out under the conditions below:

dispersion machine; Sand Grinder (Igarashi Machine Co., Ltd.)
pulverizing media; zirconium beads of 1 mm diameter
charging rate of pulverizing media; 50% (volume)
pulverizing time; 3 hours The centrifugal separation process (12000 RPM, 20 minutes) was further carried out to remove coarse particles, thereby preparing a disperse solution.

| (Preparation of Ink) | |
|---|---|
| above disperse solution | 30 parts |
| glycerol | 2 parts |
| diethylene glycol | 15 parts |
| N-methyl pyrrolidone | 4 parts |
| isopropyl alcohol | 3 parts |
| ion-exchanged water | 46 parts |

For the ink thus prepared, later-described evaluations were conducted by using an ink jet recording apparatus BJ-10V (trade name, by Canon Inc.) with an on-demand type recording multi-head in which ink is discharged by applying thermal energy corresponding to a recording signal.

Example 2

Polymerization Example 2

45 mol % of α-methylstyrene, 45 mol % of methacrylic acid, and 10 mol % of methoxytetraethylene glycol methacrylate (NK ester M-40G) were each put in a mixed solvent of ethylene glycol-monomethyl ether and isopropyl alcohol, and then subjected to solution polymerization in accordance with the ordinary process. Thereby, a polymer 2 for use in the present invention with a number-average molecular weight of 4900 and a weight-average molecular weight of 8800 was obtained.

| (Preparation of Pigment Dispersed Solution) | |
|---|---|
| polymer 2 polymerized above | 3.5 parts |
| aminomethyl propanol | 0.5 part |
| ion-exchanged water | 78 parts |
| diethylene glycol | 5 parts |

The above ingredients were mixed and heated to 50° C. using a water bath in order to completely dissolve the resin ingredient. Added to this solution was 13 parts of carbon black (MCF 88 by Mitsubishi Chemical Industry Co., Ltd.), followed by pre-mixing for 30 minutes. After that, the dispersion process was carried out under the conditions below:

dispersion machine; Pearl Mill (Ashizawa Co., Ltd.)
pulverizing media; glass beads of 1 mm diameter
charging rate of pulverizing media; 50% (volume)
delivery rate; 100 ml/minute The centrifugal separation process (12000 RPM, 20 minutes) was further carried out to remove coarse particles, thereby preparing a disperse solution.

| (Preparation of Ink) | |
|---|---|
| above disperse solution | 25 parts |
| glycerol | 8 parts |
| ethylene glycol | 5 parts |
| ethanol | 5 parts |
| Emulgen 920 (by Kao Co., Ltd.) | 0.1 part |
| ion-exchanged water | 56.9 parts |

For the ink thus prepared, later-described evaluations were conducted using the ink jet recording apparatus with an on-demand type recording multi-head in which ink is discharged by applying thermal energy corresponding to a recording signal.

Example 3

Polymerization Example 3

52 mol % of methyl methacrylate, 8 mol % of phenoxy-polyethylene glycol acrylate (NK ester AMP-60G), and 40 mol % of acrylic acid were each put in a mixed solvent of ethylene glycol-monomethyl ether and butyl alcohol, and then subjected to solution polymerization in accordance with the ordinary process. Thereby, a polymer 3 for use in the present invention with a number-average molecular weight of 7600 and a weight-average molecular weight of 12500 was obtained.

| (Preparation of Pigment Dispersed Solution) | |
|---|---|
| polymer 3 polymerized above | 1.5 parts |
| ion-exchanged water | 77.5 parts |
| ethylene glycol | 5 parts |

The above ingredients were mixed and heated to 70° C. using a water bath in order to completely dissolve the resin ingredient. Added to this solution were 15 parts of new experimentally manufactured carbon black (S170 by Degussa AG) and 1 part of isopropyl alcohol, followed by pre-mixing for 60 minutes. After that, the dispersion process was carried out under the conditions below:

dispersion machine; Sand Grinder (Igarashi Machine Co., Ltd.)
pulverizing media; zirconium beads of 0.5 mm diameter
charging rate of pulverizing media; 70% (volume)
pulverizing time; 10 hours The centrifugal separation process (12000 RPM, 20 minutes) was further carried out to remove coarse particles, thereby preparing a disperse solution.

| (Preparation of Ink) | |
|---|---|
| above disperse solution | 30 parts |
| glycerol | 12 parts |
| diethylene glycol | 15 parts |
| 2-pyrrolidone | 5 parts |

(Preparation of Ink)

| | |
|---|---|
| isopropyl alcohol | 3 parts |
| Surfynol 61 (by Kawaken Fine Chemical Co., Ltd.) | 0.1 part |
| ion-exchanged water | 34.9 parts |

For the ink thus prepared, later-described evaluations were conducted using the ink jet recording apparatus with an on-demand type recording multi-head in which ink is discharged by applying thermal energy corresponding to a recording signal.

Example 4

Polymerization Example 4

55 mol % of α-methylstyrene, 35 mol % of acrylic acid, and 10 mol % of an experimentally manufactured monomer $CH_2=CH-COO-(CH_2CH_2O)_{24}H$ were each put in a mixed solvent of ethylene glycol-monomethyl ether and isopropyl alcohol, and then subjected to solution polymerization in accordance with the ordinary process. Thereby, a polymer 4 for use in the present invention with a number-average molecular weight of 6800 and a weight-average molecular weight of 10200 was obtained.

(Preparation of Pigment Dispersed Solution and Ink)

A pigment dispersed solution and ink were prepared and subjected to the printing test exactly in the same manner as Example 1 except that the dispersion resin was replaced by the polymer 4 polymerized above in the preparation of both the pigment dispersed solution and the ink in Example 1.

Example 5

Polymerization Example 5

48 mol % of styrene, 45 mol % of methacrylic acid, and 7 mol % of an experimentally manufactured monomer $CH_2=CH-COO-(CH_2CH_2O)_{10}$-phenyl-$(CH_2)_{16}H$ were each put in a mixed solvent of ethylene glycol-monomethyl ether and isopropyl alcohol, and then subjected to solution polymerization in accordance with the ordinary process. Thereby, a polymer 5 for use in the present invention with a number-average molecular weight of 6400 and a weight-average molecular weight of 9200 was obtained.

(Preparation of Pigment Dispersed Solution and Ink)

A pigment dispersed solution and ink were prepared and subjected to the printing test exactly in the same manner as Example 2 except that the dispersion resin was replaced by the polymer 5 polymerized above in the preparation of both the pigment dispersed solution and the ink in Example 2.

Comparative Example 1

A pigment dispersed solution and ink were prepared and subjected to the printing test exactly in the same manner as Example 1 except that the dispersion resin was replaced by a styrene-acrylic acid-butyl acrylate random copolymer (manufactured on experimental basis, acid value 135, weight-average molecular weight 5500) in Example 1.

Comparative Example 2

A pigment dispersed solution and ink were prepared and subjected to the printing test exactly in the same manner as Example 2 except that the dispersion resin was replaced by a styrene-maleic acid random copolymer SMA Resin 1440 (trade name, by ARCO Chem. Co., acid value 175, weight-average molecular weight 2500) in Example 2.

Comparative Example 3

A pigment dispersed solution and ink were prepared and subjected to the printing test exactly in the same manner as Example 3 except that the dispersion resin was replaced by condensed sodium naphthalene sulfonate Roma D (trade name, by Sunnopuco Co., weight-average molecular weight 1800) in Example 3.

Evaluation 1
Printing Density of Prints

Printing was made on copying paper of Xerox 4024 and Canon NP-DRY by using the above-described ink jet recording apparatus, and printing density of the prints was measured by Macbeth densitometer (TR918).

Evaluation 2

Printing was continuously made by using the above-described ink jet recording apparatus to check at which number sheet non-discharge of the ink occurred.

Evaluation 3
Stability During Storage of Ink

The above-prepared aqueous ink was enclosed in a glass container and stored at 60° C. for six months. The ink which caused problems such as agglomeration of pigment particles and increase in viscosity after the storage period was marked X, and the ink which caused no problems was marked o.

The evaluation results are listed in Table 1 below.

TABLE 1

| | Evaluation 1 Printing Density | | Evaluation 2 Number of sheets at | Evaluation 3 Stability during |
|---|---|---|---|---|
| | Xerox4024 | NP-DRY | non-discharge | storage |
| Example 1 | 1.31 | 1.45 | no occurrence for 500 sheets | O |
| Example 2 | 1.29 | 1.42 | no occurrence for 500 sheets | O |
| Example 3 | 1.35 | 1.48 | no occurrence for 500 sheets | O |
| Example 4 | 1.31 | 1.44 | no occurrence for 500 sheets | O |
| Example 5 | 1.33 | 1.43 | no occurrence for 500 sheets | O |
| Com. Ex. 1 | 1.1 | 1.32 | no occurrence for 500 sheets | X |
| Com. Ex. 2 | 1.09 | 1.29 | 200 sheets | X |
| Com. Ex. 3 | 0.98 | 1.24 | 150 sheets | O |

As described hereinabove, the ink of the present invention has advantages, when applied to an ink jet printer utilizing thermal energy, that printed images have good durability, the ink can always be stably discharged for a long period of time even under variations in driving conditions, and satisfactory printing quality and density are obtained on any types of plain paper while ensuring high reliability and stability during long-term storage.

Example 6

Ink was prepared in the same manner as in Example 1 except that the ink ingredients in Example 1 were replaced by the following ones.

(Preparation of Ink)

| | |
|---|---|
| disperse solution used in Example 1 | 30 parts |
| diethylene glycol - monobutyl ether | 0.5 part |

-continued

| (Preparation of Ink) | |
|---|---|
| glycerol | 2 parts |
| diethylene glycol | 15 parts |
| N-methylpyrrolidone | 4 parts |
| ion-exchanged water | 48.5 parts |

The above ingredients were mixed and adjusted in pH value to fall in the range of 8 to 10 with monoethanolamine, thereby obtaining the ink of the present invention.

Example 7

Ink was prepared in the same manner as in Example 2 except that the ink ingredients in Example 2 were replaced by the following ones.

| (Preparation of Ink) | |
|---|---|
| disperse solution used in Example 2 | 25 parts |
| ethylene glycol - monobutyl ether | 1 part |
| glycerol | 8 parts |
| ethylene glycol | 5 parts |
| ion-exchanged water | 61 parts |

The above ingredients were mixed and adjusted in pH value to fall in the range of 8 to 10 with aminomethyl propanol, thereby obtaining the ink of the present invention.

Example 8

Ink was prepared in the same manner as in Example 3 except that the ink ingredients in Example 3 were replaced by the following ones.

| (Preparation of Ink) | |
|---|---|
| disperse solution used in Example 3 | 30 parts |
| triethylene glycol - monobutyl ether | 0.8 part |
| glycerol | 12 parts |
| diethylene glycol | 15 parts |
| 2-pyrrolidone | 5 parts |
| ion-exchanged water | 37.2 parts |

Example 9
(Preparation of Pigment Dispersed Solution and Ink)

A pigment dispersed solution and ink were prepared exactly in the same manner as in Example 6 except that the dispersion resin was replaced by the polymer 4 polymerized above in the preparation of both the pigment dispersed solution and the ink in Example 6.

Example 10
(Preparation of Pigment Dispersed Solution and Ink)

A pigment dispersed solution and ink were prepared exactly in the same manner as in Example 7 except that the dispersion resin was replaced by the polymer 5 polymerized above in the preparation of both the pigment dispersed solution and the ink in Example 7.

Comparative Example 4

A pigment dispersed solution and ink were prepared exactly in the same manner as in Example 7 except that the dispersion resin was replaced by a styrene-maleic acid random copolymer SMA Resin 1440 (trade name, by ARCO chem. Co., acid value 175, weight-average molecular weight 2500) in Example 7.

Comparative Example 5

A pigment dispersed solution and ink were prepared exactly in the same manner as in Example 8 except that the dispersion resin was replaced by condensed sodium naphthalene sulfonate Roma D (trade name, by Sunnopuco Co., weight-average molecular weight 1800) in Example 8, and triethylene glycol-monobutyl ether was not added and replaced by ion-exchanged water during preparation of the ink.

Evaluation

The following tests were conducted by loading the ink thus prepared in an ink jet recording apparatus BJ-10V (trade name, by Canon Inc.) with an on-demand type recording multi-head in which a recording liquid is discharged by applying thermal energy corresponding to a recording signal.

Evaluation 1
Discharge Stability of Ink

Discharge stability of the ink was evaluated and marked to be any one of three ranks below by using the above ink jet recording apparatus:

○: good

Δ: some parts disappear in solid printing area

X: almost no discharge

Evaluation 2
Printing Density of Prints

Printing was made on copying paper of Xerox 4024 and Canon NP-DRY by using the above ink jet recording apparatus, and printing density of the prints was measured by Macbeth densitometer (TR918).

Evaluation 3
Quality Evaluation of Prints

Unevenness in printing density and sharpness of character edges of the prints were visually evaluated and marked to be any one of three ranks below:

○: evenness in solid printing area was high and character edges were sharp

Δ: character edges were sharp, but unevenness was found in solid printing area

X: character edges were blurred and unevenness in solid printing area was significant The evaluation results are listed in Table 2 below.

TABLE 2

| | Evaluation Results | | | |
|---|---|---|---|---|
| | Evaluation 1 Discharge Stability | Evaluation 2 Printing Density | | Evaluation 3 Printing quality |
| | | Xerox4024 | NP-DRY | |
| Example 6 | O | 1.34 | 1.51 | O |
| Example 7 | O | 1.32 | 1.43 | O |
| Example 8 | O | 1.36 | 1.52 | O |
| Example 9 | O | 1.35 | 1.47 | O |
| Example 10 | O | 1.36 | 1.48 | O |
| Com. Ex. 4 | O | 1.13 | 1.31 | O |
| Com. Ex. 5 | Δ | 0.95 | 1.19 | Δ |

As described hereinabove, the ink of the present invention has advantages, when applied to an ink jet printer utilizing thermal energy, such that printed images have good durability, the ink can always stably be discharged for a long period of time even under variations in driving conditions, and satisfactory printing quality and density are obtained on any type of plain paper while ensuring high reliability and stability during long-term storage.

Examples using polymer selected from the group (b) as dispersant

Example 11

(Manufacture of Ink)
(Preparation of Pigment Dispersed Solution)

| | |
|---|---|
| styrene - vinyl acetate - acrylic acid copolymer (initial mol ratio in polymerization; 45:20:35, acid value 146, weight-average molecular weight 8800) | 1.5 parts |
| monoethanol amine | 1 part |
| ion-exchanged water | 81.5 parts |
| diethylene glycol | 5 parts |

The above ingredients were mixed and heated to 70° C. using a water bath in order to completely dissolve the resin ingredient. Added to this solution were 10 parts of new experimentally manufactured carbon black (MCF 88 by Mitsubishi Chemical Industry Co., Ltd., primary grain size 18 nm) and 1 part of isopropyl alcohol, followed by pre-mixing for 30 minutes. After that, the dispersion process was carried out under the same conditions as in Example 1. Further, the centrifugal separation process (12000 RPM, 20 minutes) was carried out to remove coarse particles, thereby preparing a disperse solution.

(Preparation of Ink)

| | |
|---|---|
| above disperse solution | 30 parts |
| glycerol | 2 parts |
| diethylene glycol | 15 parts |
| N-methyl pyrrolidone | 5 parts |
| isopropyl alcohol | 3 parts |
| Emulbon T-83 (organic boron-base surfactant, by Toho Chemicals Co., Ltd.) | 0.5 part |
| ion-exchanged water | 44.5 parts |

The above ingredients were mixed and adjusted in pH value to fall in the range of 8 to 10 with monoethanolamine. The ink thus prepared was tested for later-described evaluation items by using an ink jet recording apparatus with an on-demand type recording multi-head in which ink is discharged by applying thermal energy corresponding to a recording signal.

Example 12

(Manufacture of Ink)
(Preparation of Pigment Dispersed Solution)

| | |
|---|---|
| styrene - maleic acid - allyl acetate copolymer (initial mol ratio in polymerization; 50:42:8, acid value 210, weight-average molecular weight 11000) | 3 parts |
| aminomethyl propanol | 2 parts |
| ion-exchanged water | 75 parts |
| diethylene glycol | 5 parts |

The above ingredients were mixed and heated to 70° C. using a water bath in order to completely dissolve the resin ingredient. Added to this solution was 15 parts of carbon black (MCF 88 by Mitsubishi Chemical Industry Co., Ltd., primary grain size 18 nm), followed by pre-mixing for 30 minutes. After that, the dispersion process was carried out under the same conditions as in Example 2. Further, the centrifugal separation process (12000 RPM, 20 minutes) was carried out to remove coarse particles, thereby preparing a disperse solution.

(Preparation of Ink)

| | |
|---|---|
| above disperse solution | 25 parts |
| glycerol | 8 parts |
| ethylene glycol | 5 parts |
| ethanol | 5 parts |
| ion-exchanged water | 57 parts |

The above ingredients were mixed and adjusted in pH value to fall in the range of 8 to 10 with aminomethyl propanol, thereby obtaining ink.

The ink thus prepared was tested for later-described evaluation items by using the ink jet recording apparatus with an on-demand type recording multi-head in which ink is discharged by applying thermal energy corresponding to a recording signal.

Example 13

(Manufacture of Ink)
(Preparation of Pigment Dispersed Solution)

| | |
|---|---|
| styrene - methacrylic acid - vinyl propionate copolymer (initial mol ratio in polymerization; 20:50:30, acid value 230, weight-average molecular weight 13000) | 1.5 parts |
| ion-exchanged water | 81.5 parts |
| ethylene glycol | 5 parts |

The above ingredients were mixed and heated to 70° C. using a water bath in order to completely dissolve the resin ingredient. Added to this solution were 11 parts of new experimentally manufactured carbon black (S170 by Degussa AG, primary grain size 17 nm) and 1 part of isopropyl alcohol, followed by pre-mixing for 60 minutes. After that, the dispersion process was carried out under the same conditions as in Example 3. Further, the centrifugal separation process (12000 RPM, 20 minutes) was carried out to remove coarse particles, thereby preparing a disperse solution.

(Preparation of Ink)

| | |
|---|---|
| above disperse solution | 25 parts |
| glycerol | 12 parts |
| diethylene glycol | 15 parts |
| 2-pyrrolidone | 5 parts |
| isopropyl alcohol | 3 parts |
| Acetylenol EH (by Kawaken Fine Chemical Co., Ltd.) | 0.3 part |
| ion-exchanged water | 34.7 parts |

The above ingredients were mixed and adjusted in pH value to fall in the range of 8 to 10 with monoethanolamine.

The ink thus prepared was tested for later-described evaluation items by using the ink jet recording apparatus with an on-demand type recording multi-head in which ink is discharged by applying thermal energy corresponding to a recording signal.

Example 14

Ink was prepared exactly in the same manner as in Example 11 except that carbon black was replaced by Mogul L (by Cabot Co., primary grain size 24 nm), and was tested by using the ink jet recording apparatus with an on-demand type recording multi-head in which ink is discharged by applying thermal energy corresponding to a recording signal.

Example 15

Ink was prepared exactly in the same manner as in Example 12 except that carbon black was replaced by Mogul L (by Cabot Co., primary grain size 24 nm), and was tested by using the ink jet recording apparatus with an on-demand type recording multi-head in which ink is discharged by applying thermal energy corresponding to a recording signal.

The evaluation results are listed in Table 3 below. The evaluation items are the same as those used in Examples 1 to 5.

TABLE 3

| | Evaluation Results | | | |
|---|---|---|---|---|
| | Evaluation 1 Printing Density | | Evaluation 2 Number of sheets at | Evaluation 3 Stability during |
| | Xerox4024 | NP-DRY | non-discharge | storage |
| Example 11 | 1.23 | 1.32 | no occurrence for 500 sheets | O |
| Example 12 | 1.24 | 1.31 | no occurrence for 500 sheets | O |
| Example 13 | 1.27 | 1.35 | no occurrence for 500 sheets | O |
| Example 14 | 1.25 | 1.33 | no occurrence for 500 sheets | O |
| Example 15 | 1.24 | 1.32 | no occurrence for 500 sheets | O |

As described hereinabove, the ink of the present invention has advantages, when applied to an ink jet printer utilizing thermal energy, such that printed images have good durability, the ink can always be stably discharged for a long period of time even under variations in driving conditions, and satisfactory printing quality and density are obtained on any types of plain paper while ensuring high reliability and stability during long-term storage. Examples using polyethyleneimine as dispersant

Example 16

(Manufacture of Ink)
(Preparation of Pigment Dispersed Solution)

| | |
|---|---|
| polyethyleneimine (Epomin SP-200, by Nippon Shokubai Co., Ltd., Mw 10000) | 4 parts |
| ion-exchanged water | 80 parts |
| diethylene glycol | 5 parts |

The above ingredients were mixed and heated to 70° C. using a water bath in order to completely dissolve the resin ingredient. Added to this solution were 10 parts of carbon black (MCF 88 by Mitsubishi Chemical Industry Co., Ltd., primary grain size 18 nm) and 1 part of isopropyl alcohol, followed by pre-mixing for 30 minutes. After that, the dispersion process was carried out under the same conditions as in Example 1. Further, the centrifugal separation process (12000 RPM, 20 minutes) was carried out to remove coarse particles, thereby preparing a disperse solution.

(Preparation of Ink)

| | |
|---|---|
| above disperse solution | 30 parts |
| glycerol | 5 parts |
| diethylene glycol | 10 parts |
| N-methyl pyrrolidone | 5 parts |
| isopropyl alcohol | 3 parts |
| ion-exchanged water | 47 parts |

The ink thus prepared was tested by using an ink jet recording apparatus with an on-demand type recording multi-head in which ink is discharged by applying thermal energy corresponding to a recording signal.

Example 17

(Manufacture of Ink)
(Preparation of Pigment Dispersed Solution)

| | |
|---|---|
| polyethyleneimine (Epomin SP-300, by Nippon Shokubai Co., Ltd., Mw 30000) | 5 parts |
| ion-exchanged water | 75 parts |
| diethylene glycol | 5 parts |

The above ingredients were mixed and heated to 70° C. using a water bath in order to completely dissolve the resin ingredient Added to this solution was 15 parts of carbon black (MCF 88 by Mitsubishi Chemical Industry Co., Ltd., primary grain size 18 nm), followed by pre-mixing for 30 minutes. After that, the dispersion process was carried out under the same conditions as in Example 2. Further, the centrifugal separation process (12000 RPM, 20 minutes) was carried out to remove coarse particles, thereby preparing a disperse solution.

(Preparation of Ink)

| | |
|---|---|
| above disperse solution | 25 parts |
| glycerol | 8 parts |
| ethylene glycol | 5 parts |
| ethanol | 5 parts |
| ion-exchanged water | 57 parts |

The ink thus prepared was tested by using the ink jet recording apparatus with an on-demand type recording multi-head in which ink is discharged by applying thermal energy corresponding to a recording signal.

Example 18

(Manufacture of Ink)
(Preparation of Pigment Dispersed Solution)

| | |
|---|---|
| polyethyleneimine (Epomin SP-012, by Nippon Shokubai Co., Ltd., Mw 12000) | 5 parts |
| ion-exchanged water | 78 parts |
| ethylene glycol | 5 parts |

The above ingredients were mixed and heated to 70° C. using a water bath in order to completely dissolve the resin ingredient. Added to this solution were 11 parts of new experimentally manufactured carbon black (S170 by Degussa AG, primary grain size 17 nm) and 1 part of isopropyl alcohol, followed by pre-mixing for 60 minutes. After that, the dispersion process was carried out under the same conditions as in Example 3. Further, the centrifugal separation process (12000 RPM, 20 minutes) was carried out to remove coarse particles, thereby preparing a disperse solution.

(Preparation of Ink)

| | |
|---|---|
| above disperse solution | 30 parts |
| glycerol | 12 parts |
| diethylene glycol | 15 parts |
| 2-pyrrolidone | 5 parts |
| isopropyl alcohol | 3 parts |
| Acetylenol EH (by Kawaken Fine Chemical Co., Ltd.) | 0.3 part |
| ion-exchanged water | 34.7 parts |

The ink thus prepared was tested by using the ink jet recording apparatus with an on-demand type recording multi-head in which ink is discharged by applying thermal energy corresponding to a recording signal.

Example 19

Ink was prepared exactly in the same manner as in Example 16 except that carbon black was replaced by Mogul L (by Cabot Co., primary grain size 24 nm), and was tested by using the ink jet recording apparatus with an on-demand type recording multi-head in which ink is discharged by applying thermal energy corresponding to a recording signal.

Example 20

Ink was prepared exactly in the same manner as in Example 17 except that carbon black was replaced by Mogul L (by Cabot Co., primary grain size 24 nm), and was tested by using the ink jet recording apparatus with an on-demand type recording multi-head in which ink is discharged by applying thermal energy corresponding to a recording signal.

Comparative Example 6

A pigment dispersed solution and ink were prepared and subjected to the printing test exactly in the same manner as in Example 16 except that the dispersion resin was replaced by a styrene-acrylic acid-butyl acrylate random copolymer (acid value 135, weight-average molecular weight 5500) in Example 16.

Comparative Example 7

A pigment dispersed solution and ink were prepared and subjected to the printing test exactly in the same manner as in Example 17 except that the dispersion resin was replaced by a styrene-maleic acid random copolymer SMA Resin 1440 (trade name, by ARCO chem. Co., acid value 175, weight-average molecular weight 2500) in Example 17.

Comparative Example 8

A pigment dispersed solution and ink were prepared and subjected to the printing test exactly in the same manner as in Example 18 except that the dispersion resin was replaced by condensed sodium naphthalene sulfonate Roma D (trade name, by Sunnopuco Co., weight-average molecular weight 1800) in Example 18.

Evaluation 1
Printing Density of Prints

Printing was made on copying paper Xerox 4024, copying paper Canon NP-DRY, FOX RIVER: PLOVER BOND paper, and Kokuyo report paper by using the above-described ink jet recording apparatus, and printing density of the prints was measured by Macbeth densitometer (TR918).

Evaluation 2

Printing was continuously made by using the above-described ink jet recording apparatus to check at which number sheet non-discharge of the ink occurred.

Evaluation 3
Stability During Storage of Ink

The above-prepared water-based ink was enclosed in a glass container and stored at 60° C. for six months. The ink which caused problems such as agglomeration of pigment particles and increase in viscosity after the storage period was marked X, and the ink which caused no problems was marked o.

Evaluation 4
Wiping Resistance of Prints

The above-prepared water-based ink was wiped with a finger 5 minutes after the printing. The ink with which the finger was not stained was marked o, the ink with which the finger was a little stained was marked Δ, and the ink with which the finger was thickly stained was marked X.

The evaluation results are listed in Table 4 below.

TABLE 4

| | Evaluation Results | | | | | | |
|---|---|---|---|---|---|---|---|
| | Evaluation 1 Printing Density | | | | | | |
| | Xerox 4024 | NP-DRY | Plover Bond | Kokuyo report | 2 | 3 | 4 |
| Ex. 16 | 1.22 | 1.27 | 1.27 | 1.3 | no occurrence for 500 sheets | O | O |
| Ex. 17 | 1.24 | 1.25 | 1.28 | 1.31 | no occurrence for 500 sheets | O | O |
| Ex. 18 | 1.25 | 1.27 | 1.29 | 1.29 | no occurrence for 500 sheets | O | O |
| Ex. 19 | 1.25 | 1.26 | 1.28 | 1.27 | no occurrence for 500 sheets | O | O |
| Ex. 20 | 1.22 | 1.28 | 1.26 | 1.27 | no occurrence for 500 sheets | O | O |
| Com. Ex. 6 | 1.1 | 1.32 | 1.21 | 1.24 | no occurrence for 500 sheets | X | X |
| Com. Ex. 7 | 1.09 | 1.29 | 1.2 | 1.21 | 200 sheets | X | X |
| Com. Ex. 8 | 0.98 | 1.24 | 1.14 | 1.24 | 150 sheets | O | Δ |

2: Evaluation 2 Number of sheets at non-discharge
3: Evaluation 3 Stability during storage
4: Evaluation 4 Wiping resistance As described hereinabove, the ink of the present invention has advantages, when applied to an ink jet printer utilizing thermal energy, such that printed images have good durability, the ink can always be stably discharged for a long period of time even under variations in driving conditions, and satisfactory printing quality and density are obtained on any types of plain paper and superior wiping resistance of prints is provided while ensuring high reliability and stability during long-term storage.

[Examples Using White Inorganic Fine Particles]

Example 21

(Preparation of Pigment Dispersed Solution)

| | |
|---|---|
| styrene - acrylic acid - butyl acrylate copolymer (acid value 116, | 1.5 parts |

(Preparation of Pigment Dispersed Solution)

| | |
|---|---|
| weight-average molecular weight 3700) | |
| monoethanolamine | 1 part |
| ion-exchanged water | 79 parts |
| diethylene glycol | 5 parts |

The above ingredients were mixed and heated to 70° C. using a water bath in order to completely dissolve the resin ingredient. Added to this solution were 10 parts of new experimentally manufactured carbon black (MCF 88 by Mitsubishi Chemical Industry Co., Ltd., primary grain size 18 nm), 2.5 parts of surface-treated titanium dioxide (DS-4 by Idemitsu Kosan Co., Ltd., primary grain size 17 nm), and 1 part of isopropyl alcohol, followed by pre-mixing for 30 minutes. After that, the dispersion process was carried out under the same conditions as in Example 1.

Further, the centrifugal separation process (12000 RPM, 20 minutes) was carried out to remove coarse particles, thereby preparing a disperse solution.

(Preparation of Ink)

| | |
|---|---|
| above disperse solution | 30 parts |
| diethylene glycol - monobutyl ether | 0.5 part |
| glycerol | 2 parts |
| diethylene glycol | 15 parts |
| N-methyl pyrrolidone | 5 parts |
| ion-exchanged water | 47.5 parts |

The above ingredients were mixed and adjusted in pH value to fall in the range of 8 to 10 with monoethanolamine, thereby obtaining the ink of the present invention.

Example 22

(Preparation of Pigment Dispersed Solution)

| | |
|---|---|
| styrene - maleic acid half ester copolymer (acid value 200, weight-average molecular weight 12000) | 4 parts |
| aminomethyl propanol | 2 parts |
| ion-exchanged water | 71 parts |
| diethylene glycol | 5 parts |

The above ingredients were mixed and heated to 70° C. using a water bath in order to completely dissolve the resin ingredient. Added to this solution were 15 parts of carbon black (MCF 88 by Mitsubishi Chemical Industry Co., Ltd., primary grain size 18 nm) and 3 parts of surface-treated titanium dioxide (DS-4 by Idemitsu Kosan Co., Ltd., primary grain size 17 nm), followed by pre-mixing for 30 minutes. After that, the dispersion process was carried out under the same conditions as in Example 2.

Further, the centrifugal separation process (12000 RPM, 20 minutes) was carried out to remove coarse particles, thereby preparing a disperse solution.

(Preparation of Ink)

| | |
|---|---|
| above disperse solution | 20 parts |
| ethylene glycol - monobutyl ether | 1 part |
| glycerol | 8 parts |
| ethylene glycol | 5 parts |
| ion-exchanged water | 66 parts |

The above ingredients were mixed and adjusted in pH value to fall in the range of 8 to 10 with aminomethyl propanol, thereby obtaining ink.

Example 23

Ink was prepared exactly in the same manner as in Example 21 except that carbon black was replaced by Mogul L (by Cabot Co., primary grain size 24 nm).

Example 24

Ink was prepared exactly in the same manner as in Example 21 except that surface-treated titanium dioxide (IT-PC by Idemitsu Kosan Co., Ltd., primary grain size 60 nm) was used as the white inorganic fine particles.

Example 25

Ink was prepared exactly in the same manner as in Example 21 except that alumina fine particles (Aluminum Oxide C by Nippon Aerosil Co., Ltd., primary grain size 13 nm) was used as the white inorganic fine particles.

Example 26

(Preparation of Pigment Dispersed Solution)

| | |
|---|---|
| Roma D (by Sunnopuco Co., sodium naphthalene sulfonate) | 1.5 parts |
| ion-exchanged water | 79.5 parts |
| ethylene glycol | 5 parts |

The above ingredients were mixed and heated to 70° C. using a water bath in order to completely dissolve the resin ingredient. Added to this solution were 11 parts of new experimentally manufactured carbon black (S170 by Degussa AG, primary grain size 17 nm), 2 parts of surface-treated titanium dioxide (DS-4 by Idemitsu Kosan Co., Ltd., primary grain size 17 nm) and 1 part of isopropyl alcohol, followed by pre-mixing for 60 minutes. After that, the dispersion process was carried out under the same conditions as in Example 3.

Further, the centrifugal separation process (12000 RPM, 20 minutes) was carried out to remove coarse particles, thereby preparing a disperse solution.

(Preparation of Ink)

| | |
|---|---|
| above disperse solution | 30 parts |
| triethylene glycol - monobutyl ether | 0.5 part |
| glycerol | 12 parts |
| diethylene glycol | 15 parts |
| 2-pyrrolidone | 5 parts |
| ion-exchanged water | 37.5 parts |

The above ingredients were mixed and adjusted in pH value to fall in the range of 8 to 10 with monoethanolamine, thereby obtaining ink.

Reference Example 1

Ink was prepared in the same manner as in Example 21 except that diethylene glycol-monobutyl ether was not added and replaced by ion-exchanged water in the preparation of the ink in Example 21.

Reference Example 2

Ink was prepared in the same manner as in Example 22 except that the white inorganic fine particles were not added and replaced by ion-exchanged water in the preparation of the pigment dispersed solution in Example 22.

Reference Example 3

Ink was prepared in the same manner as in Example 23 except that diethylene glycol-monobutyl ether was not added and replaced by ion-exchanged water in the preparation of the ink in Example 23.

Reference Example 4

Ink was prepared in the same manner as in Example 26 except that the white inorganic fine particles were not added and replaced by ion-exchanged water in the preparation of pigment dispersed solution in Example 26.

Reference Example 5

Ink was prepared in the same manner as in Example 21 except that 2.5 parts, in terms of solid, of methyl polymethacrylate-base fine particles ME1000cf (by Soken Chemicals, Co., Ltd., primary grain size 450 nm, dispersed in water) was added in place of the white inorganic fine particles in the preparation of pigment dispersed solution in Example 21.

Evaluation

Evaluation was made similarly to Examples 6 to 10. The evaluation results are listed in Table 5 below.

TABLE 5

Evaluation Results

|  | Evaluation 1 Discharge Stability | Evaluation 2 Printing Density | | Evaluation 3 Printing quality |
|---|---|---|---|---|
|  |  | Xerox4024 | NP-DRY |  |
| Example 21 | O | 1.35 | 1.47 | O |
| Example 22 | O | 1.35 | 1.45 | O |
| Example 23 | O | 1.38 | 1.52 | O |
| Example 24 | O | 1.33 | 1.42 | O |
| Example 25 | O | 1.32 | 1.39 | O |
| Example 26 | O | 1.30 | 1.35 | O |
| Ref. Ex. 1 | Δ | 1.28 | 1.38 | O |
| Ref. Ex. 2 | O | 1.12 | 1.25 | O |
| Ref. Ex. 3 | Δ | 1.30 | 1.42 | Δ |
| Ref. Ex. 4 | O | 0.95 | 1.13 | O |
| Ref. Ex. 5 | Δ | 1.15 | 1.29 | O |

Examples Using Rosin-denaturated Maleic Acid as Dispersant

Example 27

(Preparation of Pigment Dispersed Solution)

| Malkyd No. 32 (by Arakawa Chemicals Co., Ltd.) | 1.5 parts |
|---|---|
| monoethanol amine | 1 part |
| ion-exchanged water | 81.5 parts |
| diethylene glycol | 5 parts |

The above ingredients were mixed and heated to 70° C. using a water bath in order to completely dissolve the resin ingredient. Added to this solution were 10 parts of new experimentally manufactured carbon black (MCF 88 by Mitsubishi Chemical Industry Co., Ltd., primary grain size 18 nm) and 1 part of isopropyl alcohol, followed by pre-mixing for 30 minutes. After that, the dispersion process was carried out under the same conditions as in Example 1.

Further, the centrifugal separation process (12000 RPM, 20 minutes) was carried out to remove coarse particles, thereby preparing a disperse solution.

(Preparation of Ink)

| above disperse solution | 30 parts |
|---|---|
| diethylene glycol - monobutyl ether | 0.5 part |
| glycerol | 2 parts |
| diethylene glycol | 15 parts |
| N-methyl pyrrolidone | 5 parts |
| isopropyl alcohol | 3 parts |
| Emulbon T-83 (organic boron-base surfactant, by Toho Chemicals Co., Ltd.) | 0.5 part |
| ion-exchanged water | 44.5 parts |

The above ingredients were mixed and adjusted in pH value to fall in the range of 8 to 10 with monoethanolamine, thereby obtaining the ink of the present invention.

Example 28

(Preparation of Pigment Dispersed Solution)

| Hiparac C (by Nippon Shellac Co., Ltd.) | 1 part |
|---|---|
| aminomethyl propanol | 2 parts |
| ion-exchanged water | 77 parts |
| diethylene glycol | 5 parts |

The above ingredients were mixed and heated to 70° C. using a water bath in order to completely dissolve the resin ingredient. Added to this solution was 15 parts of carbon black (MCF 88 by Mitsubishi Chemical Industry Co., Ltd., primary grain size 18 nm), followed by pre-mixing for 30 minutes. After that, the dispersion process was carried out under the same conditions as in Example 2.

Further, the centrifugal separation process (12000 RPM, 20 minutes) was carried out to remove coarse particles, thereby preparing a disperse solution.

(Preparation of Ink)

| above disperse solution | 25 parts |
|---|---|
| ethylene glycol - monobutyl ether | 0.8 part |
| glycerol | 9 parts |
| ethylene glycol | 5 parts |
| ion-exchanged water | 60.2 parts |

The above ingredients were mixed and adjusted in pH value to fall in the range of 8 to 10 with aminomethyl propanol, thereby obtaining ink.

Example 29

Ink was prepared exactly in the same manner as in Example 28 except that carbon black was replaced by Mogul L (by Cabot Co., primary grain size 24 nm).

Example 30

(Preparation of Pigment Dispersed Solution)

| | |
|---|---|
| Malkyd No. 31 (by Arakawa Chemicals Co., Ltd.) | 1.5 parts |
| ion-exchanged water | 82.5 parts |
| ethylene glycol | 5 parts |

The above ingredients were mixed and heated to 70° C. using a water bath in order to completely dissolve the resin ingredient. Added to this solution was 11 parts of new experimentally manufactured carbon black (S170 by Degussa AG, primary grain size 24 nm), followed by pre-mixing for 60 minutes. After that, the dispersion process was carried out under the same conditions as in Example 3.

Further, the centrifugal separation process (12000 RPM, 20 minutes) was carried out to remove coarse particles, thereby preparing a disperse solution.

(Preparation of Ink)

| | |
|---|---|
| above disperse solution | 30 parts |
| triethylene glycol - monobutyl ether | 0.5 part |
| glycerol | 12 parts |
| diethylene glycol | 15 parts |
| 2-pyrrolidone | 5 parts |
| ion-exchanged water | 37.5 parts |

The above ingredients were mixed and adjusted in pH value to fall in the range of 8 to 10 with monoethanolamine, thereby obtaining the ink of the present invention.

Reference Example 6

Ink was prepared in the same manner as in Example 27 except that diethylene glycol-monobutyl ether, as alkyl ether (with alkyl group having 4 or more carbons) of polyhydric alcohol according to the present invention, was not used and replaced by ion-exchanged water in the preparation of ink.

Reference Examples 7 and 8

Ink was prepared in the same manner as in Examples 28 and 29 except that Hiparac C, as rosin-denaturated maleic acid according to the present invention, was not added, but styrene-acrylic acid-butyl acrylate copolymer (acid value 110/weight-average molecular weight 7000) was instead in the preparation of pigment dispersed solution.

Reference Example 9

Ink was prepared in the same manner as in Example 30 except that triethylene glycol-monobutyl ether was not used and replaced by ion-exchanged water in the preparation of ink.

Evaluation

Evaluation was made similarly to Examples 6 to 10. The evaluation results are listed in Table 6 below.

TABLE 6

Evaluation Results

| | Evaluation 1 Discharge Stability | Evaluation 2 Printing Density | | Evaluation 3 Printing quality |
|---|---|---|---|---|
| | | Xerox4024 | NP-DRY | |
| Example 27 | O | 1.35 | 1.28 | O |
| Example 28 | O | 1.38 | 1.32 | O |
| Example 29 | O | 1.41 | 1.33 | O |
| Example 30 | O | 1.40 | 1.32 | O |
| Ref. Ex. 6 | Δ | 1.28 | 1.15 | Δ |
| Ref. Ex. 7 | O | 1.30 | 1.25 | Δ |
| Ref. Ex. 8 | O | 1.25 | 1.20 | Δ |
| Ref. Ex. 9 | Δ | 1.20 | 1.15 | Δ |

As described hereinabove, the ink of the present invention has advantages, when applied to an ink jet printer utilizing thermal energy, such that printed images have good durability, the ink can always be stably discharged for a long period of time even under variations in driving conditions, and satisfactory printing quality and density are obtained on any types of plain paper while ensuring high reliability and stability during long-term storage.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A water-based ink for ink-jet recording, comprising a water-insoluble pigment, a dispersant for dispersing said pigment, a water-soluble organic solvent, and water, wherein said dispersant is at least one compound selected from the group consisting of (a) and (b):

(a) a copolymer having a hydrophilic part and a hydrophobic part, said hydrophilic part comprising the polymerization product of at least one monomer containing a long-chain nonionic group selected from the group consisting of formulae (I), (II) and (III), at 3 to 25 mol % of said copolymer, and α, β-ethylenic unsaturated carboxylic acid, at 5 to 60 mol % of said copolymer, $$CH_2=C(R)-COO-(CH_2CH_2O)_mH \qquad (I)$$

$$CH_2=C(R)-COO-(CH_2CH_2O)_n-(CH_2)_lH \qquad (II)$$

$$CH_2=C(R)-COO-(CH_2CH_2O)_p\text{-phenyl-}(CH_2)_qH \qquad (III)$$

where R is H or $CH_3$, m and n are each a numeral from 2 to 24, l is a numeral from 1 to 12, p is a numeral from 1 to 12, and q is a numeral from 0 to 16; and (b) polyethyleneimine.

2. A water-based ink according to claim 1, wherein said ink contains, as said dispersant, a copolymer selected from the group consisting of said group (a) and, as said water-soluble organic solvent, at least one selected from the group consisting of monoalkyl ether of diol, monoalkyl ether of triol, and dialkyl ether of triol.

3. A water-based ink according to claim 1, wherein the weight-average molecular weight of a copolymer selected from the group consisting of said group (a) is in the range of 500 to 30000.

4. A water-based ink according to claim 1, wherein the weight-average molecular weight of a copolymer selected from the group consisting of said group (a) is in the range of 1000 to 15000.

5. A water-based ink according to claim 1, wherein the content of a copolymer selected from the group consisting of said group (a) is in the range of 0.1 to 5 wt % with respect to the total weight of the ink.

6. A water-based ink according to claim 1, wherein the weight-average molecular weight of said polyethylenimine is in the range of 1000 to 40000.

7. A water-based ink according to claim 1, wherein said ink contains said polyethyleneimine in the range of 0.1 to 10 wt % based on the total weight of the ink.

8. A water-based ink containing a pigment, a dispersant for dispersing said pigment, a water-soluble organic solvent, water, and white inorganic fine particles, wherein said dispersant is at least one compound selected from the group consisting of (a) and (b):

(a) a copolymer having a hydrophilic part and a hydrophobic part, said hydrophilic part comprising the polymerization product of at least one monomer containing a long-chain nonionic group selected from the group consisting of formulae (I), (II) and (III), at 3 to 25 mol % of said copolymer, and α, β-ethylenic unsaturated carboxylic acid, at 5 to 60 mol % of said copolymer,

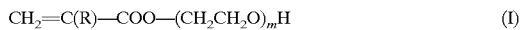  (I)

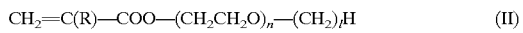  (II)

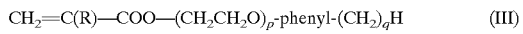  (III)

where R is H or $CH_3$, m and n are each a numeral from 2 to 24, l is a numeral from 1 to 12, p is a numeral from 1 to 12, and q is a numeral from 0 to 16; and (b) polyethyleneimine;

and wherein said ink contains at least one water-soluble organic solvent selected from the group consisting of monoalkyl ether of diol, monoalkyl ether of triol and dialkyl ether of triol.

9. A water-based ink according to claim 8, wherein said white inorganic fine particles are titanium dioxide fine particles or alumina fine particles.

10. A water-based ink according to claim 8, wherein the ratio of primary particle size of said white inorganic fine particles to primary particle size of said pigment is in the range of 1/10 to 5/1.

11. A water-based ink according to claim 8, wherein the content ratio in weight of said white inorganic fine particles to said pigment is in the range of 1/20 to 1/1.

12. A water-based ink according to claim 1, wherein said ink contains, as said organic solvent, at least one solvent, selected from the group consisting of methanol, ethanol, propanol, and butanol.

13. A water-based ink according to claim 1, wherein said dispersant is said copolymer.

14. A water-based ink according to claim 1, wherein said dispersant is polyethyleneimine.

15. A water-based ink according to claim 8, wherein said dispersant is said copolymer.

16. A water-based ink according to claim 8, wherein said dispersant is polyethyleneimine.

17. A water-based ink according to claim 1, having a pH in a range of 6 to 8.

18. A water-based ink comprising a pigment, a dispersant for dispersing said pigment, a water-soluble organic solvent, and water, wherein said dispersant is a copolymer having a hydrophilic part and a hydrophobic part, said hydrophilic part comprising the polymerization product of at least one monomer containing a long-chain nonionic group selected from the group consisting of formulae (I), (II) and (III), at 3 to 25 mol % of said copolymer, and α, β-ethylenic unsaturated carboxylic acid, at 5 to 60 mol % of said copolymer,

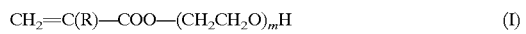  (I)

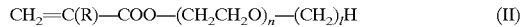  (II)

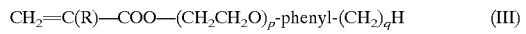  (III)

where R is H or $CH_3$, m and n are each a numeral from 2 to 24, l is a numeral from 1 to 12, p is a numeral from 1 to 12, and q is a numeral from 0 to 16.

19. A water-based ink according to claim 18, having a pH in a range of 6 to 8.

* * * * *

UNITED STATES PATENT AND TRADEMARK OFFICE
CERTIFICATE OF CORRECTION

PATENT NO. : 6,011,098
DATED : January 4, 2000
INVENTOR(S) : Akio Kashiwazaki, et al.

It is certified that error appears in the above-identified patent and that said Letters Patent is hereby corrected as shown below:

Column 1:
Line 41, "water" should read --water-based--.

Column 2:
Line 10, "be remained" should read --remain--.

Column 3:
Line 36, "make" should read --make a--.

Column 5:
Line 43, "includes" should read --include--.

Column 6:
Line 63, "wt %.,"should read --wt %, --.

Column 7:
Line 4, "e.g., such as," should be deleted.
Line 46, "to water" should read --with water--.

Column 8:
Line 10, "them," should read --them are--.
Line 44, "trouble" should be deleted.

Column 9:
Line 21, "result" should read --results--.

Column 17:
Line 66, "chem." should read --Chem.--.

Column 19:
Line 1, "polymer" should read --polymers--.
Line 2, "dispersant" should read --dispersant:--.

UNITED STATES PATENT AND TRADEMARK OFFICE
CERTIFICATE OF CORRECTION

PATENT NO.    : 6,011,098
DATED         : January 4, 2000
INVENTOR(S)   : Akio Kashiwazaki, et al.

It is certified that error appears in the above-identified patent and that said Letters Patent is hereby corrected as shown below:

Column 21:
Line 44, "storage. Examples" should read --storage. ¶Examples--.
Line 45, "dispersant" should read --dispersant:--.

Column 22:
Line 28, "ingredient Added" should read --ingredient. Added--.

Column 23:
Line 53, "chem." should read --Chem.--.

Column 24:
Line 2, "and" should read --and the--.

UNITED STATES PATENT AND TRADEMARK OFFICE
CERTIFICATE OF CORRECTION

PATENT NO. : 6,011,098
DATED : January 4, 2000
INVENTOR(S) : Akio Kashiwazaki, et al.

It is certified that error appears in the above-identified patent and that said Letters Patent is hereby corrected as shown below:

Column 27:
TABLE 5, Line 47, "1.28   1.38   O" should read --1.28   1.38   Δ--.

Column 31:
Line 10, "polyethylenimine" should read --polyethyleneimine--.

Column 32:
Line 21, "6 to 8." should read --7 to 10.--.
Line 41, "6 to 8." should read --7 to 10.--.

Signed and Sealed this

Third Day of July, 2001

*Attest:*

NICHOLAS P. GODICI
*Attesting Officer*  *Acting Director of the United States Patent and Trademark Office*